(12) United States Patent
Han et al.

(10) Patent No.: US 11,867,791 B2
(45) Date of Patent: Jan. 9, 2024

(54) ARTIFICIAL INTELLIGENCE APPARATUS FOR DETERMINING PATH OF USER AND METHOD FOR THE SAME

(71) Applicant: LG Electronics Inc., Seoul (KR)

(72) Inventors: Jongwoo Han, Seoul (KR); Hyoeun Kim, Seoul (KR); Taeho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 651 days.

(21) Appl. No.: 16/605,429

(22) PCT Filed: Jun. 14, 2019

(86) PCT No.: PCT/KR2019/007228
§ 371 (c)(1),
(2) Date: Oct. 15, 2019

(87) PCT Pub. No.: WO2020/251101
PCT Pub. Date: Dec. 17, 2020

(65) Prior Publication Data
US 2021/0325521 A1    Oct. 21, 2021

(51) Int. Cl.
*G01S 5/30* (2006.01)
*G01S 11/14* (2006.01)
(Continued)

(52) U.S. Cl.
CPC .............. *G01S 11/14* (2013.01); *G01S 5/30* (2013.01); *G05D 1/0219* (2013.01);
(Continued)

(58) Field of Classification Search
CPC ......... G01S 11/14; G01S 5/30; G05D 1/0219; G05D 1/0221; G06F 3/165; G06N 3/08
See application file for complete search history.

(56) References Cited

U.S. PATENT DOCUMENTS 8,644,113 B2 * 2/2014 Harrell ...................... G01S 5/26
367/118
10,291,999 B1 * 5/2019 Ayotte ...................... G01S 5/26
(Continued)

FOREIGN PATENT DOCUMENTS

KR        100549214        2/2006
KR        100827080        5/2008
(Continued)

OTHER PUBLICATIONS

PCT International Search Report in International Application No. PCT/KR2019/007228, dated Mar. 12, 2020, 14 pages (with English translation).

*Primary Examiner* — Isam A Alsomiri
*Assistant Examiner* — Abdallah Abulaban
(74) *Attorney, Agent, or Firm* — Fish & Richardson P.C.

(57) ABSTRACT

An embodiment of the present invention provides, comprising: a communication unit configured to communicate with a plurality of external AI apparatuses; and a processor configured to receive sound signals of the user from the plurality of external AI apparatuses, calculate a distance and a variation of the distance from each of the plurality of external AI apparatuses to the user based on the received sound signals, determine a current path of the user based on the calculated distance and the calculated variation of the distance, and determine a future path of the user based on the current path.

16 Claims, 22 Drawing Sheets

(51) Int. Cl.
*G05D 1/02* (2020.01)
*G06F 3/16* (2006.01)
*G06N 3/08* (2023.01)

(52) U.S. Cl.
CPC ........... *G05D 1/0221* (2013.01); *G06F 3/165* (2013.01); *G06N 3/08* (2013.01)

(56) References Cited

U.S. PATENT DOCUMENTS

| | | | |
|---|---|---|---|
| 2015/0279356 A1* | 10/2015 | Lee | ........................ G10L 15/20 704/251 |
| 2017/0076212 A1 | 3/2017 | Shams et al. | |
| 2018/0131856 A1* | 5/2018 | Sato | ........................ G05D 1/12 |
| 2018/0336905 A1 | 11/2018 | Kim et al. | |

FOREIGN PATENT DOCUMENTS

| | | | |
|---|---|---|---|
| KR | 101966253 B1 * | 10/2015 | |
| KR | 1020150113701 | 10/2015 | |
| KR | 101966253 B1 * | 12/2018 | |
| KR | 1020180134628 | 12/2018 | |
| KR | 1020190014569 | 2/2019 | |

* cited by examiner (a)

(b)

(a)

(b)

ARTIFICIAL INTELLIGENCE APPARATUS FOR DETERMINING PATH OF USER AND METHOD FOR THE SAME

CROSS-REFERENCE TO RELATED APPLICATION

This application is a National Stage application under 35 U.S.C. § 371 of International Application No. PCT/KR2019/007228, filed on Jun. 14, 2019, which is incorporated by reference.

BACKGROUND

The present invention relates to an artificial intelligence (AI) apparatus for determining a path of a user and a method for the same. In particular, the present invention relates to an AI apparatus for determining a future path based on a current path of a user in an environment provided with a plurality of AI apparatuses and a method for the same.

Recently, devices loaded with an AI function have been increasing. To that end, a large number of users having various AI apparatuses in their houses have been increasing. However, current AI apparatuses merely individually operate, and do not function as organically operating one another.

In addition, conventional techniques are assumed to interact with an AI apparatus in a situation that the user stops, and do not provide a function appropriate for a situation that the user moves. If a path of the user is capable of being recognized in his/her house, a variety of AI apparatuses may be organically operated based on a location of the user, and a variety of services capable of enhancing the user's convenience may be provided.

SUMMARY

The present invention is to provide an AI apparatus and a method for the same for determining a current path of a user by using sound signals received from a plurality of AI apparatuses, and determining a future path based on the current path.

In addition, the present invention is to provide an AI apparatus and a method for the same for determining a location relation of a plurality of AI apparatuses based on received sound signals, although the user does not set locations of the AI apparatuses.

An embodiment of the present invention provides an AI apparatus and a method for the same for receiving sound signals for a user from a plurality of external AI apparatuses, calculating a distance from each of the plurality of external AI apparatuses to the user and a variation of the distance based on the received sound signals, determining a current path of the user based on the calculated distance and the variation of the distance, and determining a future path of the user based on the current path.

In addition, an embodiment of the present invention provides an AI apparatus and a method for the same for additionally considering at least one of a record of a path of a user, current time information, weather information, a record of interaction with a user, state information of a plurality of external AI apparatuses or a content of an utterance voice of the user.

In addition, an embodiment of the present invention provides an AI apparatus and a method for the same for determining candidate areas in which each of a plurality of external AI apparatuses may be located, based on a distance from each of the AI apparatuses calculated at different times to a user and a variation of the distance, and automatically determining a relative location relation between the plurality of AI apparatuses based on the determined candidate areas.

In addition, an embodiment of the present invention provides an AI apparatus and a method for the same for determining a maximum value of an utterance volume of a user received from the AI apparatus to be an utterance volume in the closest distance from a corresponding AI apparatus.

According to various embodiments of the present invention, the future path as well as the current path of the user may be predicted in a space provided with the plurality of AI apparatuses, and a service appropriate for a path of the user may be provided.

In addition, according to various embodiments of the present invention, an organic function may be provided by recognizing a relative location relation of the plurality of AI apparatuses without input of the user.

In addition, according to various embodiments of the present invention, a distance from each of the AI apparatuses to the user may be more exactly determined in setting an utterance volume in the closest distance from each of the AI apparatuses.

DETAILED DESCRIPTION OF THE EMBODIMENTS

Figure 1:
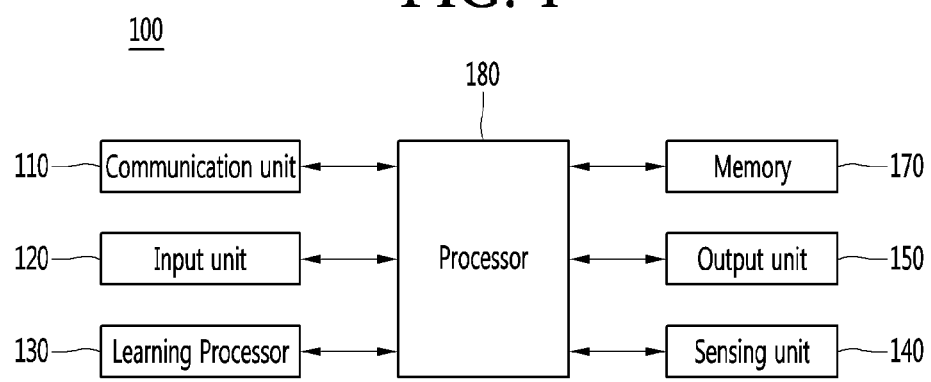
FIG. 1 is a block diagram illustrating an AI apparatus 100 according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
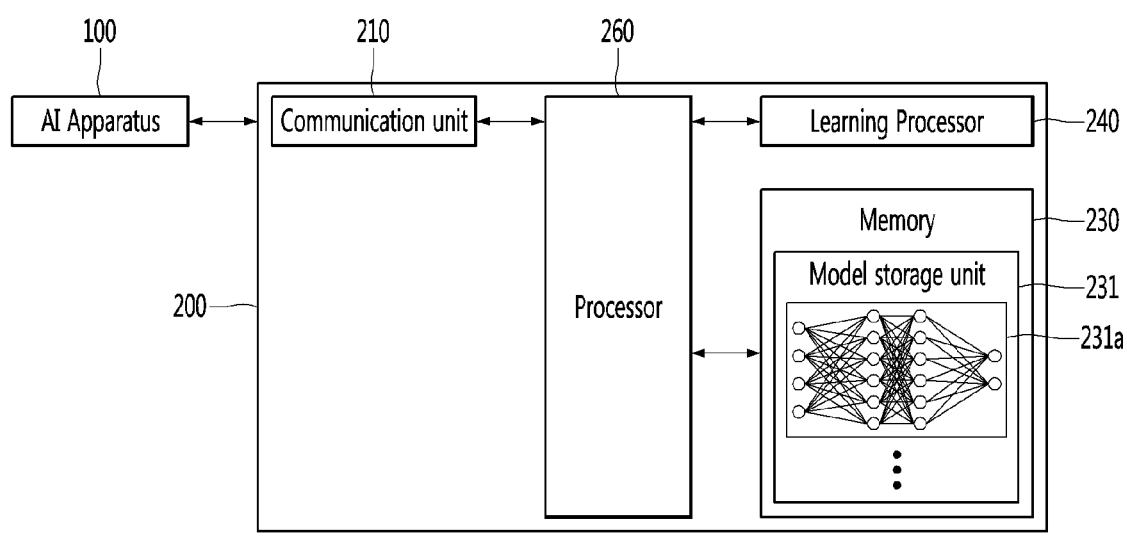
FIG. 2 is a block diagram illustrating an AI server 200 according to an embodiment of the present invention.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
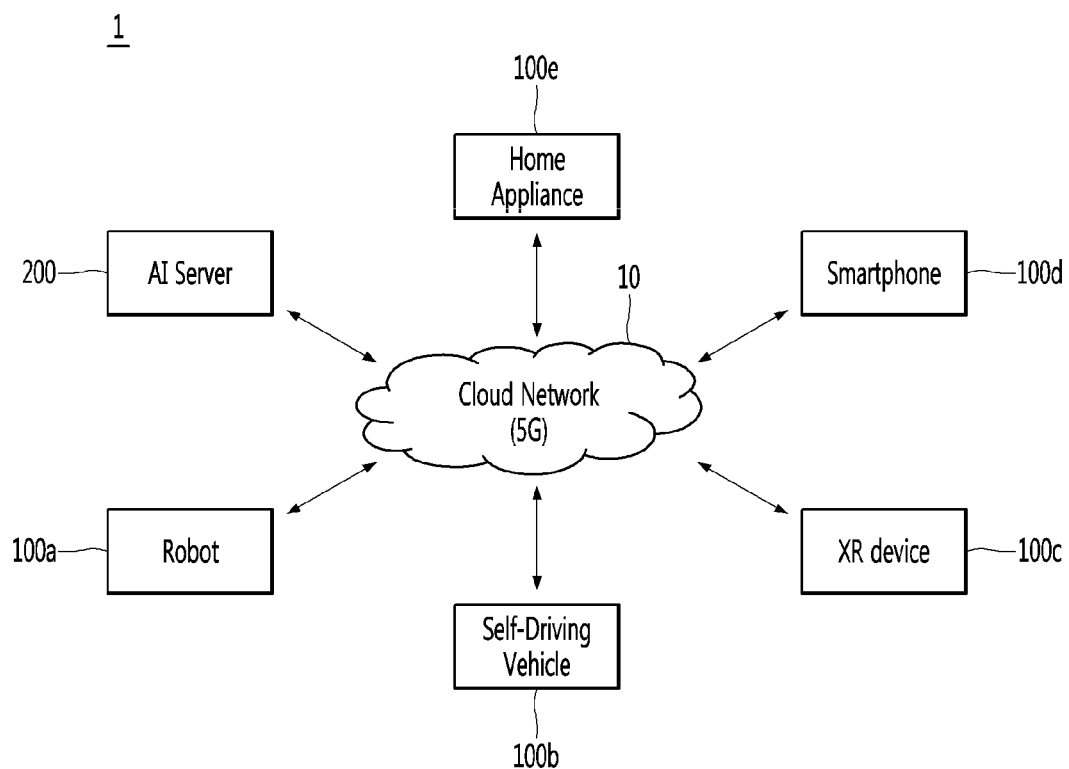
FIG. 3 is a view illustrating an AI system 1 according to an embodiment of the present invention.

FIG. 3 is a view illustrating an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100*b* or interworking with the user who rides on the self-driving vehicle 100*b*.

Here, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from, the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
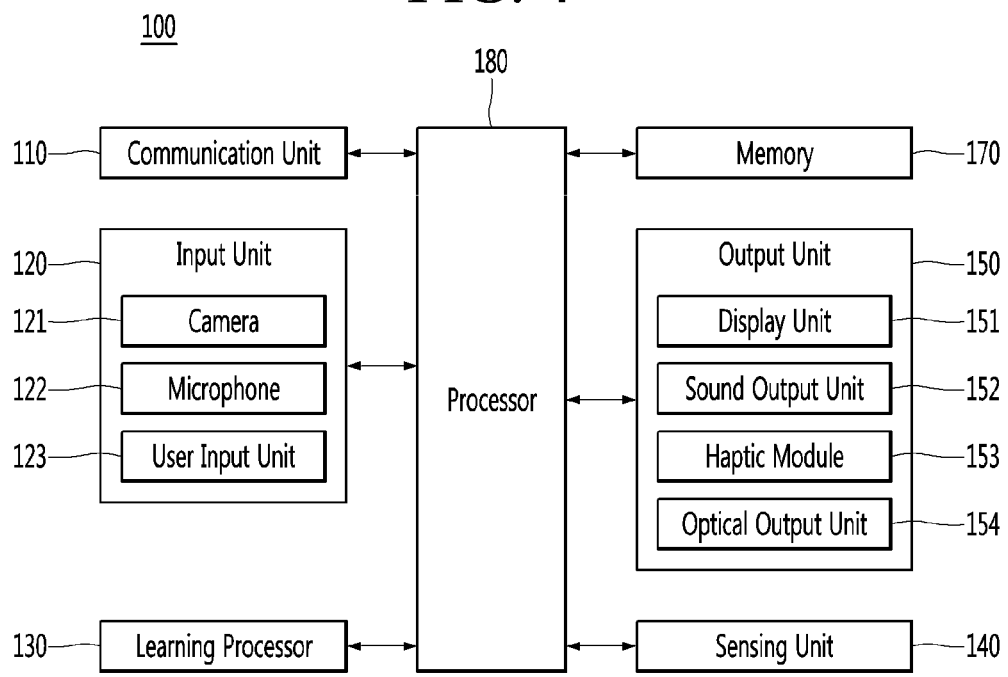
FIG. 4 is a block diagram illustrating an AI apparatus 100 according to an embodiment of the present invention.

FIG. 4 is a block diagram illustrating an AI apparatus 100 according to an embodiment of the present invention.

The redundant repeat of FIG. 1 will be omitted below.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
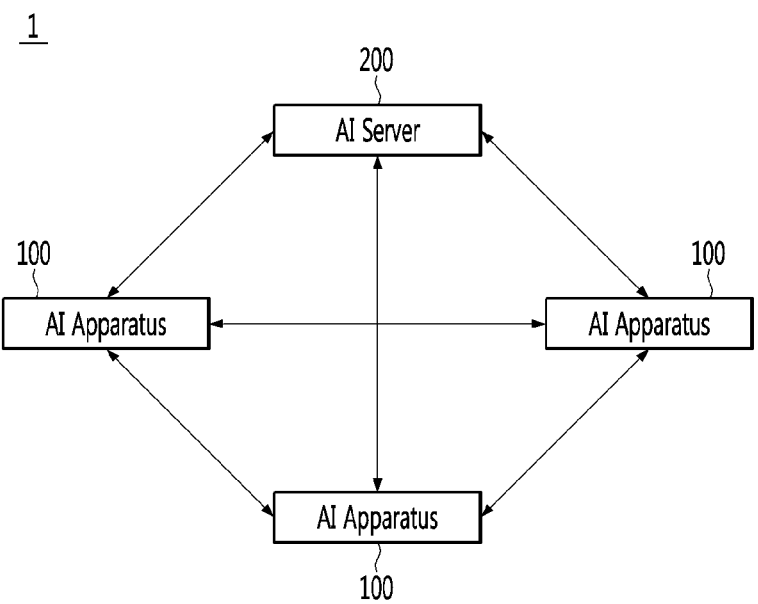
FIG. 5 is a view illustrating an AI system 1 according to an embodiment of the present invention.

FIG. 5 is a view illustrating an AI system 1 according to an embodiment of the present invention.

Referring to FIG. 5, according to an embodiment of the present invention, the AI system 1 may include at least one of an AI apparatus 100 or an AI server 200.

The at least one of the AI apparatus 100 or the AI server 200 may communicate with each other by using a wired or wireless communication technique.

Here, each of the apparatuses 100, 200 may communicate with each other through a base station, a router and so forth, but may directly communicate with each other by using a local communication technique and the like.

For example, each of the apparatuses 100, 200 may communicate with each other through the base station or directly by using 5G (5th generation) communication.

Here, one of a plurality of AI apparatuses 100 constituting the AI system 1 may be operated as a main agent representing the other AI apparatuses 100. In addition, the other AI apparatuses 100, not the main agent, may be referred to as external AI apparatuses.

Herein, a specific AI apparatus 100 may be fixed and operated as the main agent, but various AI apparatuses 100 may be variably operated as the main agents.

Although not shown in FIG. 5, according to an embodiment of the present invention, various devices capable of controlling the AI apparatuses 100 may be included in the AI system 1, and Internet of things devices are included therein.

Figure 6:
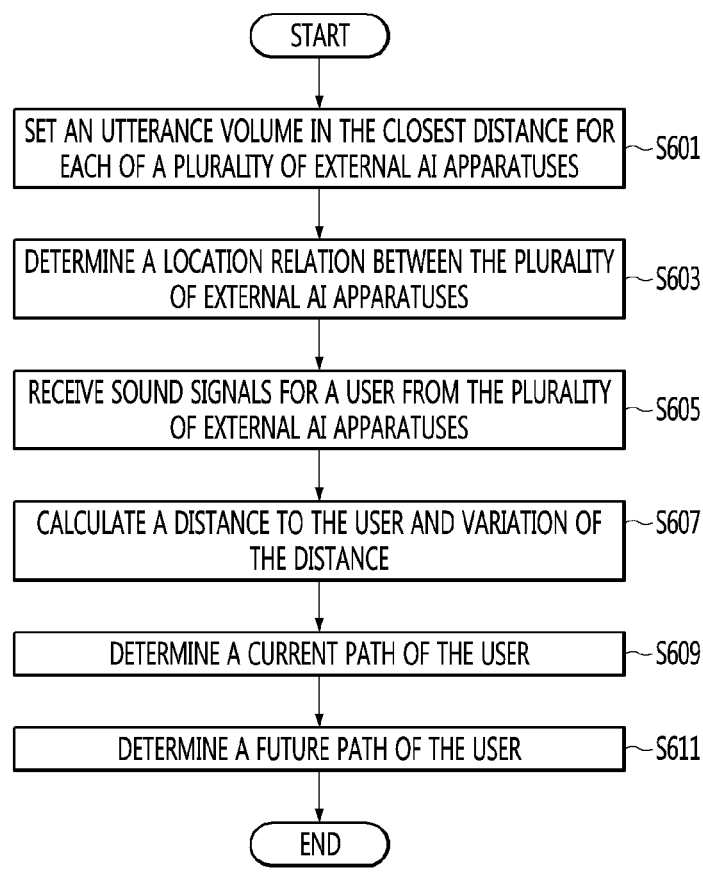
FIG. 6 is a flowchart illustrating a method for predicting a path of a user in an AI apparatus according to an embodiment of the present invention.

FIG. 6 is a flowchart illustrating a method for predicting a path of a user in an AI apparatus 100 according to an embodiment of the present invention.

Referring to FIG. 6, the processor 180 of the AI apparatus 100 sets an utterance volume in the closest distance based on a received utterance voice of the user, for each of the plurality of external AI apparatuses (S601).

The AI apparatus 100 may communicate with the plurality of external AI apparatuses through the communication unit 110.

The processor 180 may set the greatest utterance volume of the user received from each of the plurality of external AI apparatuses to an utterance volume in a distance closest to a corresponding external AI apparatus.

The processor 180 may automatically set and adjust the utterance volume in the closest distance based on an utterance voice of the user received from each of the plurality of external AI apparatuses.

The processor 180 may request the user to utter more than a predetermined number in the distance closest to each of the external AI apparatuses by manually proceeding to a setting process of the utterance volume in the closest distance, and may set the utterance volume in the closest distance based on the utterance voice of the user.

The processor 180 may set the utterance volume in the distance closest to each of the external AI apparatuses per each user, by distinguishing utterance voices for a plurality of users from each other.

Here, the processor 180 may identify users from sound signals corresponding to the utterance voice of the user by using a user identifying model learned by the machine learning algorithm or the deep learning algorithm.

The user identifying model may be learned in the learning processor 130 of the AI apparatus 100, and may be learned in the learning processor 240 of the AI server 200. In addition, the processor 180 may identify the users by directly using the user identifying model stored in the memory 170, and may transmit the sound signals to the AI server 200 and receive user identifying information identified using the user identifying model from the AI server 200.

Here, the processor 180 may mutually identify the utterance voices of the plurality of users based on a voiceprint analysis of received utterance voices, and may mutually identify the utterance voices of the users by the input of the user.

If the utterance volume is set in the closest distance for each of the external AI apparatuses, then a distance to the user may be more exactly calculated based on the volume of the utterance voice of the user.

Then, the processor 180 of the AI apparatus 100 determines a location relation between the plurality of external AI apparatuses (S603).

The external AI apparatuses mean other AI apparatuses 100 that belong to the identical AI system 1 that the AI apparatus 100 belongs.

The process of determining the location relation between the plurality of external AI apparatuses may be divided into a manual determination process according to the input of the user and an automatic determination process automatically performed without the input of the user.

According to the manual determination process, the processor 180 may determine locations of each of the external AI apparatuses or the location relation between each of the external AI apparatuses, based on the input of the user.

Here, the processor 180 may determine the locations of each of the external AI apparatuses based on the input of the user and map data for a space provided with the external AI apparatuses.

Herein, the map data may be acquired according to an SLAM (Simultaneous Localization And Mapping) technique.

According to the automatic determination process, the processor 180 may calculate the distance from each of the external AI apparatuses to the user, and may determine the location relation between the external AI apparatuses based on calculated distance information.

Here, the processor 180 may determine the locations of each of the external AI apparatuses or the location relation of each of the external AI apparatuses based on data received from the external AI apparatuses capable of determining their own locations for themselves among the external AI apparatuses.

For example, the external AI apparatus such as a robot cleaner may recognize its own location in a space and may recognize things by using image data acquired through a loaded camera. Hence, the robot cleaner may recognize the other external AI apparatuses while moving in the space, determine the locations of the external AI apparatuses in the space, and determine the location relation between the external AI apparatuses.

Each of the external AI apparatuses may emit sound signals or electric signals for recognizing their mutual location relation, and may determine distances to the other external AI apparatuses based on the sound signals or the electric signals received from the other external AI apparatuses. The sound signals may be composed of human audible frequencies, but may be composed of signals which the user cannot hear by including non-audible frequencies.

In addition, the locations of each of the external AI apparatuses may be determined in consideration of the content of the utterance voice or the interaction of the user.

Then, the processor 180 of the AI apparatus 100 receives the sound signals for the user from the plurality of external AI apparatuses (S605).

The sound signals for the user may mean sound signals corresponding to the utterance voice of the user, footstep sounds of the user, sounds created from objects which the user operates, and the like.

Then, the processor 180 of the AI apparatus 100 calculates the distance from at least one of the external AI apparatuses to the user based on the received sound signals and a variation of the distance (S607).

The processor 180 may calculate the distance to the user based on the volumes of the sound signals received from each of the external AI apparatuses, and may calculate the variation of the distance based on a variation of the volumes of the sound signals.

That is, the volume of the sound signal at a specific time is used to calculate the distance from the external AI apparatus to the user at the time, and the volumes of the sound signals during a specific period are used to calculate the variation of the distance from the external AI apparatus to the user during the period.

The processor 180 may calculate the distance from the utterance voice of the user included in the received sound signals to the user and the variation of the distance, but may calculate the distance from the footstep sounds of the user to the user and the variation of the distance.

Here, the processor 180 may identify each of the users through the voiceprint analysis of the utterance voice, and may identify each of the users by analyzing a pattern of the footstep sounds.

For example, the processor 180 may identify each of the users through intervals of the footstep sounds, features of the footstep sounds, the volumes of the footstep sounds and the like, and the features of the footstep sounds may include whether the user wears a pair of slippers, what shoes the user wears, whether the user clumps, and so forth.

Since the step S601 set the utterance volume in the closest distance for each of the external AI apparatuses, if the sound signals for the user are received, the distance from each of the AI apparatuses to the user may be more exactly calculated through the received sound signals.

In particular, if a stereo microphone is included in the external AI apparatus, the processor 180 may determine a direction of the user for the external AI apparatus by using the sound signals received through the stereo microphone.

If the sound signals are received through the stereo microphone, an input time difference is present in the sound signals due to a location difference of each microphone, and the direction of the user may be determined based on the input time difference.

Then, the processor 180 of the AI apparatus 100 determines a current path of the user (S609).

The processor 180 may determine the current path of the user based on the distance from each of the external AI apparatuses to the user and the variation of the distance.

Herein, the current path indicates only a path on which the user actually moves, and does not include a future path that indicates where the user will move later. A path including the future path of the user may be referred to as a prediction path or a future path by distinguishing from the current path.

For example, if the utterance voice of the user is determined to be increased in regular succession in order of a first AI apparatus, a second AI apparatus and a third AI apparatus, it may be determined that the user passes from the first AI apparatus to the second AI apparatus and moves toward the third AI apparatus.

Here, the processor 180 may determine the location of the user by using triangulation or interpolation from the distance from each of the external AI apparatuses to the user, and may determine the current path of the user based on a change of the determined location of the user.

Thendition, the processor 180 of the AI apparatus 100 determines the future path of the user (S611).

The determination of the future path may mean a prediction of the future path.

For example, the processor 180 may determine a movement direction of the user from the current path of the user, and if the other external AI apparatuses are located in the movement direction of the user, the processor 180 may predict that the future path of the user will be to move to the corresponding external AI apparatus.

The processor 180 may predict the future path of the user based on the current path of the user and a record of a path of the user.

For example, if the current path of the user is a path moving from the first AI apparatus to the second AI apparatus, and the user is highly likely to move straight to the third AI apparatus when the user moves from the first AI apparatus to the second AI apparatus in consideration of a record of a path of the corresponding user, the processor 180 may predict that the future path of the corresponding user will be a path moving straight to the third AI apparatus by passing from the first AI apparatus to the second AI apparatus.

Here, the processor 180 may predict the future path by additionally considering at least one of current time information, weather information, a record of interaction with the user, state information of each of the external AI apparatuses, or a content of the utterance voice of the user.

The current time information, the weather information, the record of the interaction with the user and the state information of each of the external AI apparatuses all are basic information capable of determining what operation the user will perform currently and where the user will move.

A behavior of the user is interrelated to time and weather. In addition, the content that the user interacted with the AI apparatus, the state information of each of the AI apparatuses and the content of the utterance voice of a current user are interrelated to interaction or an operation of a next user. Herein the content of the utterance voice of the user may mean intension information of the utterance voice of the user.

For example, if the user operated a washing machine as an AI apparatus before, the operation of the washing machine is currently completed and the user is recognized to move toward washing machine, the processor 180 may expect the user to move to the washing machine to operate the washing machine with a high possibility. In addition, based on this, the processor 180 may determine the future path of the user to be moving to the washing machine.

For example, it is assumed that the user goes out every morning and comes home early in the evening on weekdays, and if the user gets home, he/she goes to a bedroom first and then goes out to a living room to turn on the TV. If it was a weekday and the user went out in the morning and came home early in the evening, the processor 180 may expect the user to move in order of the bedroom and the living room with a high possibility. Further, based on this, the processor 180 may determine the future path of the user to be moving in order of the bedroom and the living room.

For example, it is assumed that the user is in the living room currently, and he/she should pass through a refrigerator to reach the washing machine. If the user is recognized to currently move in the direction from the living room to the refrigerator while uttering an inquiry for information for the washing machine, the processor 180 may expect the user to move to the washing machine to operate the washing machine with a high possibility. In addition, based on this, the processor 180 may determine the future path of the user to be moving to the washing machine.

Here, the processor 180 may determine the content of the utterance voice or intention information from the sound signals corresponding to the utterance voice of the user by using a natural language processing (NLP) engine learned by the machine learning algorithm or the deep learning algorithm.

The NLP engine may be learned in the learning processor 130 of the AI apparatus 100, and may be learned in the learning processor 240 of the AI server 200. In addition, the processor 180 may determine the intension information of the utterance voice of the user by directly using the NLP engine stored in the memory 170, may transmit the sound signals to the AI server 200, and may receive the intension information determined using the NLP engine from the AI server 200.

The current path and the future path of the user may be expressed based on the external AI apparatus, but may be expressed with a keyword and the like which indicate a specific space. In addition, they may be expressed with a location or coordinates information on the map data.

Here, when the current path and the future path of the user are determined, at least one of the locations of each of the external AI apparatuses or the relative location relation may be used.

Furthermore, as described above, since the processor 180 may identify each of the users for the sound signals, the future paths appropriate per each user may be predicted.

That is, the processor 180 may specify the user for the sound signals, determine the current path of the specified user, and predict the future path of the specified user based on at least one of the current path of the specific user, the current time information or the record of the path.

Figure 7:
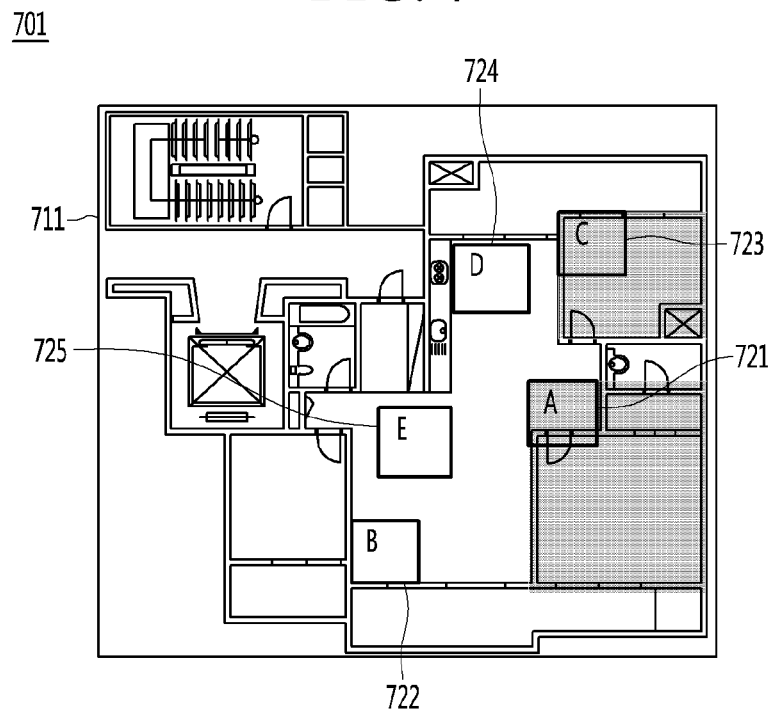
FIG. 7 is a view illustrating a space where an AI system is formed according to an embodiment of the present invention.

FIG. 7 is a view illustrating a space where an AI system 701 is formed according to an embodiment of the present invention.

Referring to FIG. 7, according to an embodiment of the present invention, the AI system 701 may be installed in a house 711, and may include a plurality of AI apparatus 721 to 725.

For example, the AI system 701 may include AI apparatuses such as a first AI speaker 721, air conditioner 722, a second AI speaker 723, a refrigerator 724, a robot cleaner 725 and so forth. Herein, the robot cleaner 725 may be a moveable AI apparatus unlike the other AI apparatuses 721 to 724.

Here, each of the AI apparatuses 721 to 725 may determine locations of each of the AI apparatuses 721 to 725 and a location relation between each of the AI apparatuses 721 to 725 based on the input of the user and map data in the house 711.

Herein, each of the AI apparatuses 721 to 725 may share location information and location relation information with the other AI apparatuses 721 to 725.

Figure 8:
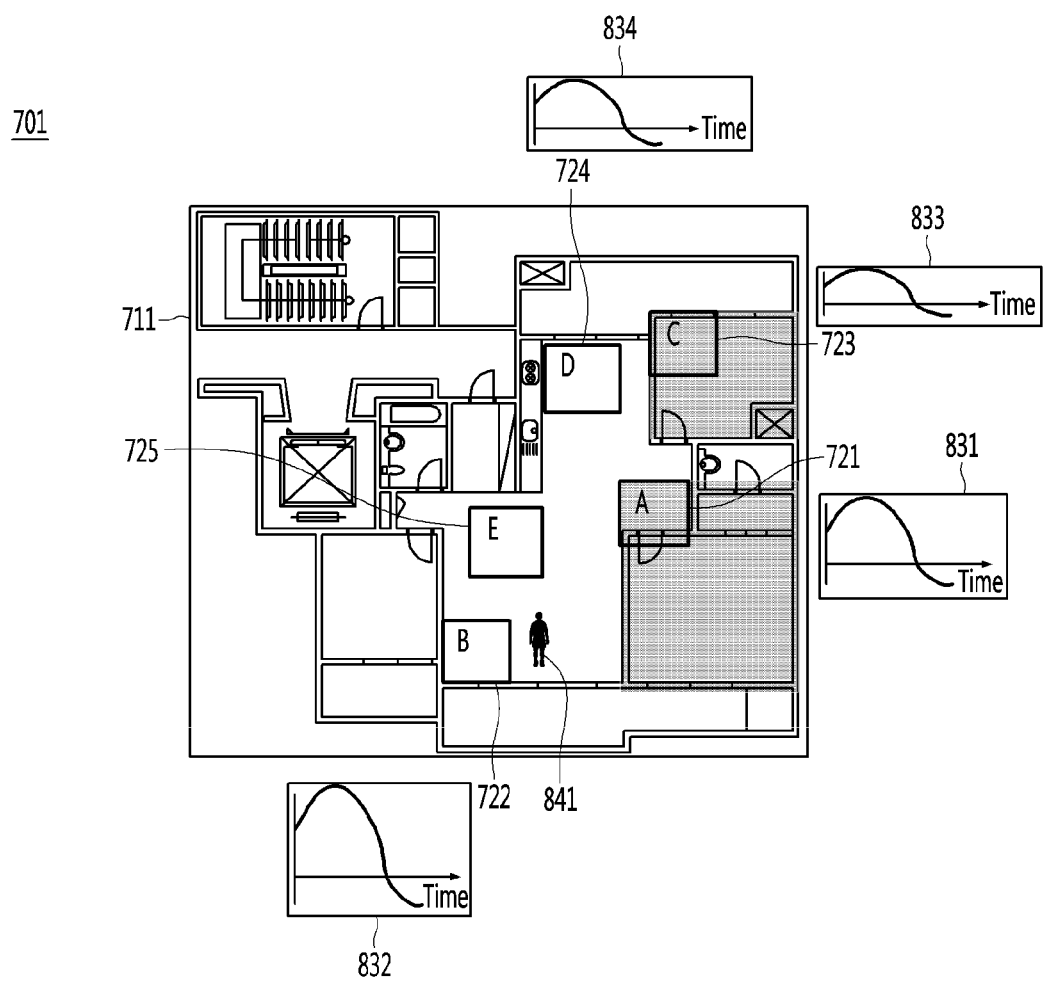
FIGS. 8 and 9 are views illustrating a volume of an utterance voice of a user received from AI apparatuses.
Figure 9:
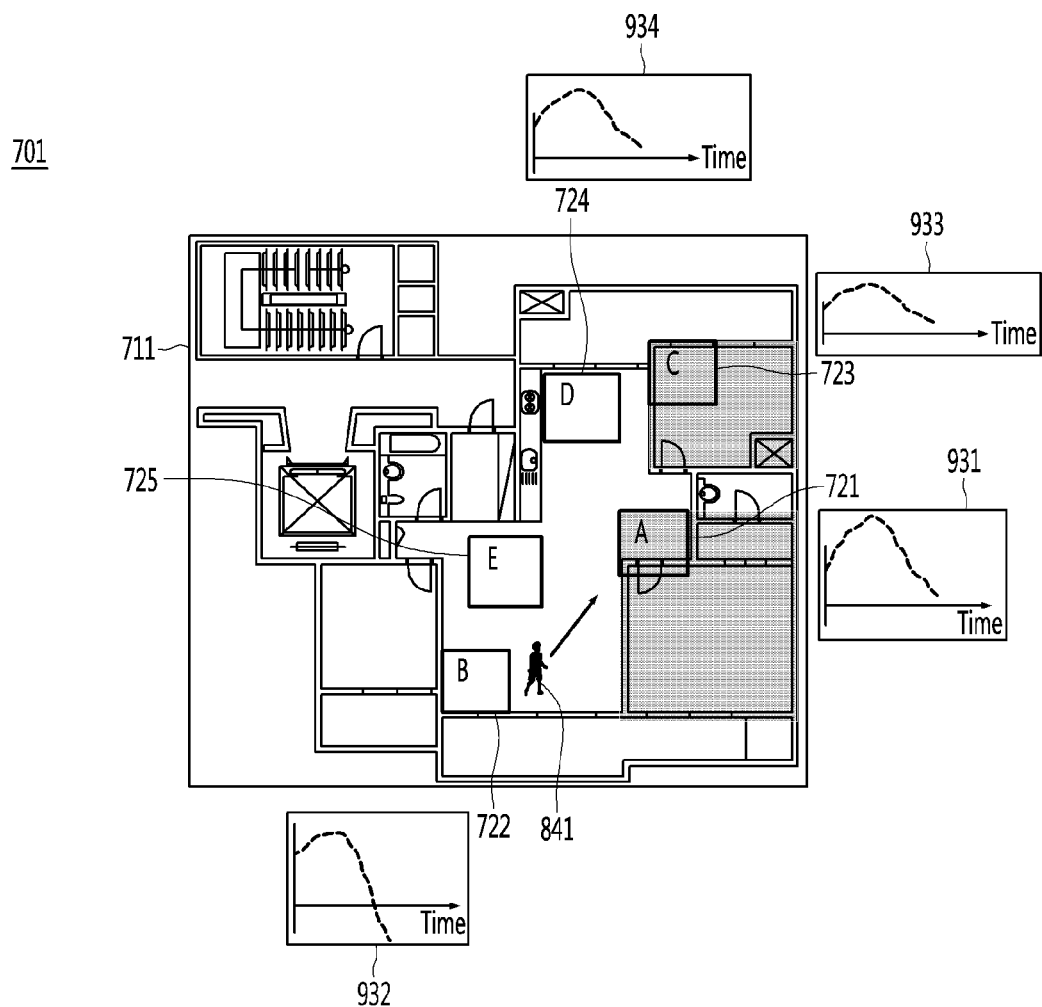

FIGS. 8 and 9 are views illustrating a volume of an utterance voice of a user received from AI apparatuses.

In particular, FIG. 8 indicates a situation that a user 841 utters in a stop state in the AI system 701 illustrated in FIG. 7, and FIG. 9 indicates a situation that the user 841 utters in moving in the AI system 701 illustrated in FIG. 7.

FIGS. 8 and 9 do not illustrate an utterance voice of the user 841 received from the robot cleaner 725, but the robot cleaner 725 may also receive the utterance voice of the user 841 by operating in the house 711.

Referring to FIG. 8, if the user 841 utters in the stop state, volumes 831 to 834 of the utterance voices received from each of the AI apparatuses 721 to 724 are integrally increased/decreased in the same shape.

Herein, the volumes 831 to 834 of the utterance voices received from each of the AI apparatuses 721 to 724 are different from one another, through which a distance between the user 841 and each of the AI apparatuses 721 to 724 may be recognized. In addition, the location of the user 841 may be determined through the triangulation.

However, referring to FIG. 9, if the user 841 utters in moving, volumes 931 to 934 of the utterance voices received from each of the AI apparatuses 721 to 724 are diversely changed depending on a location change of the user 841.

The user 841 is moving in a direction of growing away from the air conditioner 722, and approaching the first AI speaker 721, the second AI speaker 723 and the refrigerator 724.

Hence, in the utterance voice of the user 841 received from the air conditioner 722, the volume of the utterance voice 932 in a moving state is more rapidly decreased than that of the utterance voice 832 in the stop state. In addition, an overall utterance volume is decreased.

On the other hand, in the utterance voice of the user 841 received from the first AI speaker 721, the second AI speaker 723 and the refrigerator 724, the volumes of the utterance voice 931, 933, 934 in the moving state are more rapidly increased than those of the utterance voices 831, 833, 834 in the stop state. In addition, an overall utterance volume is increased.

A location variation or a current path of the user 841 may be recognized based on variations of the volumes 931 to 934 of the utterance voices of the user received from each of the AI apparatuses 721 to 724.

FIGS. 8 and 9 only illustrate an example of the utterance voice of the user, but the location of the user and the current path of the user can be recognized based on the footstep sounds of the user as well as the utterance voice of the user.

Figure 10:
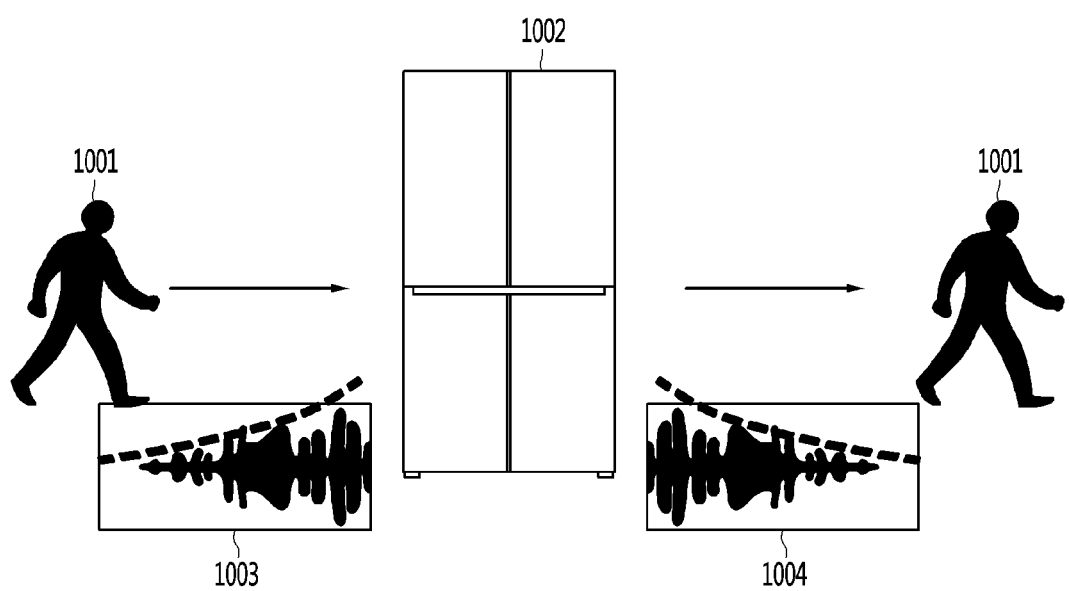
FIG. 10 is a view illustrating a change of a sound signal for a user depending on a movement of the user.

FIG. 10 is a view illustrating a change of a sound signal for a user depending on a movement of the user.

In particular, FIG. 10 indicates a situation that a user 1001 passes around an AI apparatus 1002.

Referring to FIG. 10, the AI apparatus 1002 receives sound signals 1003, 1004 for the user 1001 including an utterance voice or a footstep sound of the user 1001.

If the user 1001 approaches the AI apparatus 1002, a volume of the sound signal 1003 received by the AI apparatus 1002 gets bigger.

On the other hand, if the user 1001 grows away from the AI apparatus 1002, a volume of the sound signal 1004 received by the AI apparatus 1002 gets smaller.

That is, the AI apparatus 1002 may determine whether the user 1001 approaches the AI apparatus 1002 based on changes of the volumes of the received sound signals.

Obviously, as described above, since the distance to the user 1001 may be calculated based on the volume of the sound signals, it may be determined whether the user 1001 approaches the AI apparatus 1002 based on the variation of the distance to the user 1001.

Figure 11:
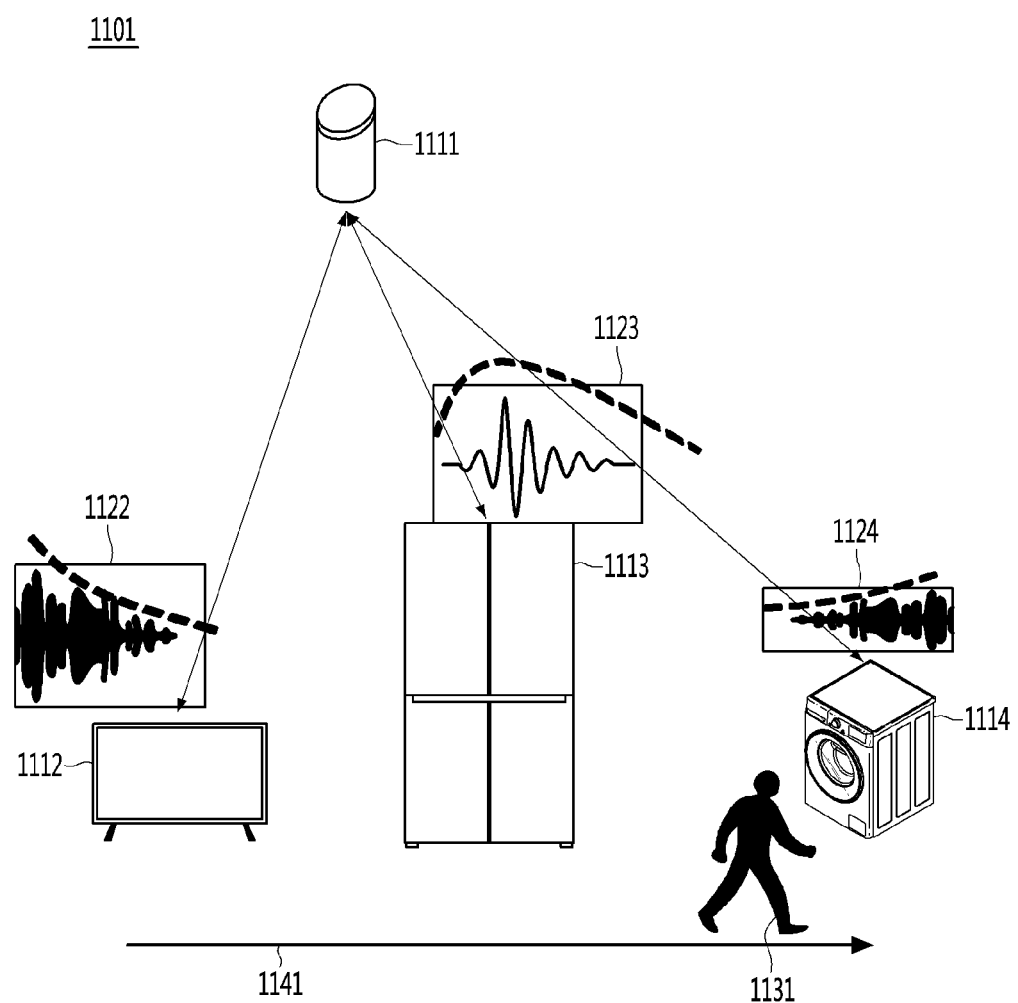
FIG. 11 is a view illustrating a method for determining a path of a user according to an embodiment of the present invention.

FIG. 11 is a view illustrating a method for determining a path of a user according to an embodiment of the present invention.

Referring to FIG. 11, according to an embodiment of the present invention, an AI system 1101 includes an AI speaker 1111 functioning as a main agent or a hub, and a TV 1112, a refrigerator 1113 and a washing machine 1114 as external AI apparatuses.

A user 1131 moved along a path 1141 approaching the washing machine 1114 by passing the TV 1112 and the refrigerator 1113 in order.

As the user 1131 moves along the path 1141, a volume of a sound signal 1122 received from the TV 1112 is decreased, a volume of a signal sound 1123 received from the refrigerator 1113 gets bigger and gets smaller back, and an overall volume of a sound signal 1124 received from the washing machine 1114 is small but gets bigger.

The AI speaker 1111 may receive sound signals 1122, 1123, 1124 received from the TV 1112, the refrigerator 1113 and the washing machine 1114, and may determine the path 1141 of the user 1131 based on the sound volumes of the received sound signals 1122, 1123, 1124 and the changes of the sound volumes.

Figure 12:
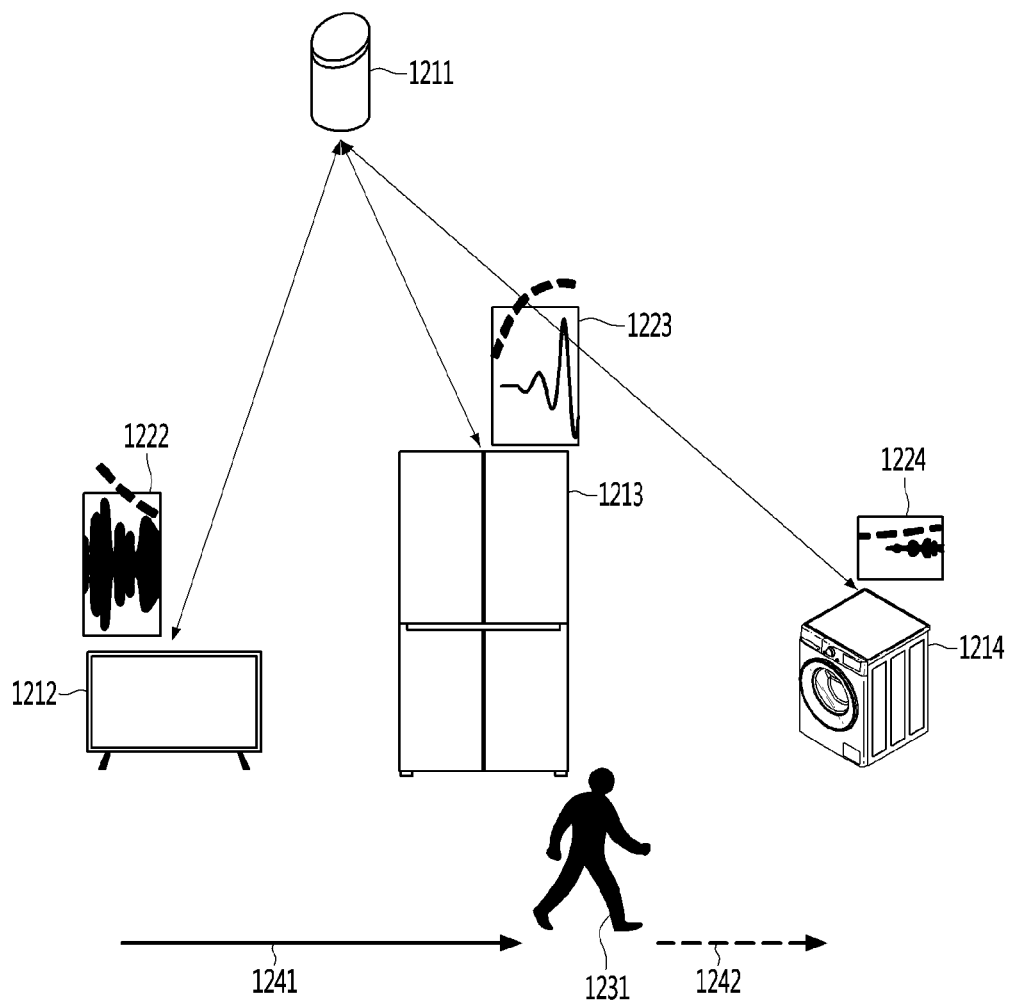
FIG. 12 is a view illustrating a method for determining a path of a user according to an embodiment of the present invention.

FIG. 12 is a view illustrating a method for determining a path of a user according to an embodiment of the present invention.

Referring to FIG. 12, according to an embodiment of the present invention, an AI system 1201 includes an AI speaker 1211 functioning as a main agent or a hub, and the TV 1212, the refrigerator 1213 and the washing machine 1214 as external AI apparatuses.

A user 1231 moved along a first path 1241 moving by passing the TV 1212 and the refrigerator 1213.

As the user 1231 moves along the first path 1241, a volume of a sound signal 1222 received from the TV 1212 is decreased, a volume of a signal sound 1223 received from the refrigerator 1213 gets bigger and gets a little bit smaller at the end, and an overall volume of a sound signal 1224 received from the washing machine 1214 is small but gets bigger.

The AI speaker 1211 may receive the sound signals 1122, 1123, 1124 received from the TV 1212, the refrigerator 1213 and the washing machine 1214, and may determine the current path of the user 1231 to be the first path 1241 based on the sound volumes of the received sound signals 1222, 1123, 1124 and the changes of the sound volumes.

The AI speaker 1211 may determine a future path of the user 1231 to be a second path 1242 passing the refrigerator 1213 and facing the washing machine 1214 based on a location relation of the external AI apparatuses 1212, 1213, 1214, and the like.

For example, it is assumed that the user 1231 is recognized to usually pass the TV 1212 and the refrigerator 1213 at 9 in the morning to reach the washing machine 1214. If the user 1231 is determined to move along the first path 1241 in a direction from the TV 1212 to the refrigerator 1213 at about 9 in the morning, the AI speaker 1211 may determine the future path of the user to be the second path 1242 passing the refrigerator 1213 and facing the washing machine 1214.

If the user 1231 moves and simultaneously says "How is the laundry going?", the user 1231 may be expected to move to the washing machine 1214 based on a content of the utterance voice. To that end, the AI speaker 1211 may determine the future path of the user to be the second path 1242 passing the refrigerator 1213 and facing the washing machine 1214.

Figure 13:
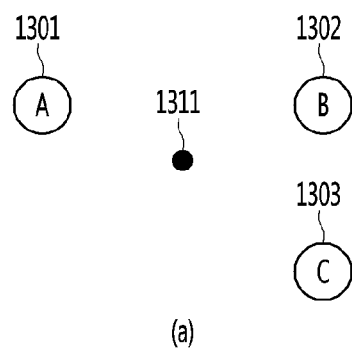
FIGS. 13 to 15 are views illustrating a method for automatically determining a relative location relation between AI apparatuses according to an embodiment of the present invention.
Figure 13:
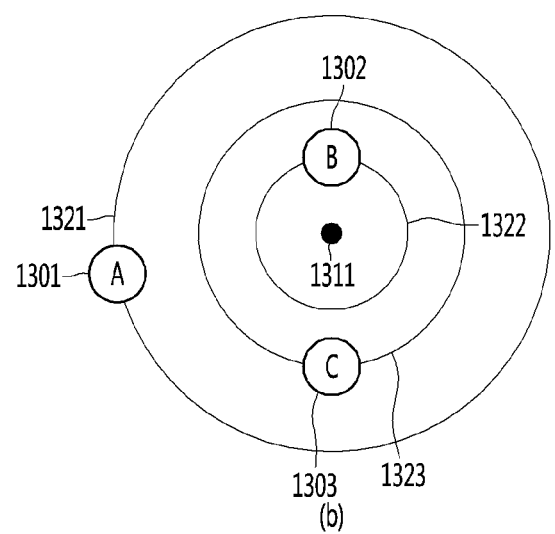
Figure 14:
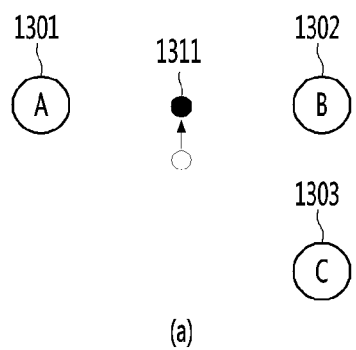
Figure 14:
Figure 14:
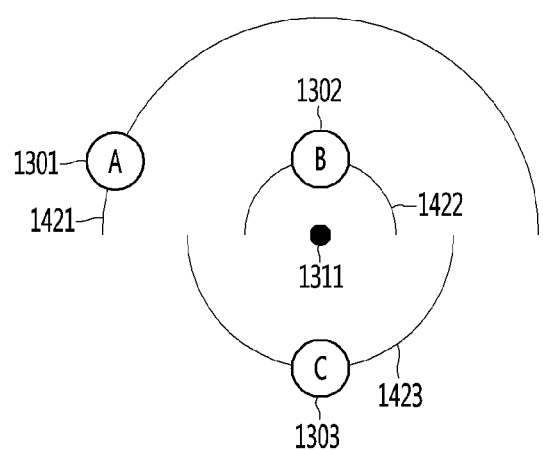
Figure 15:
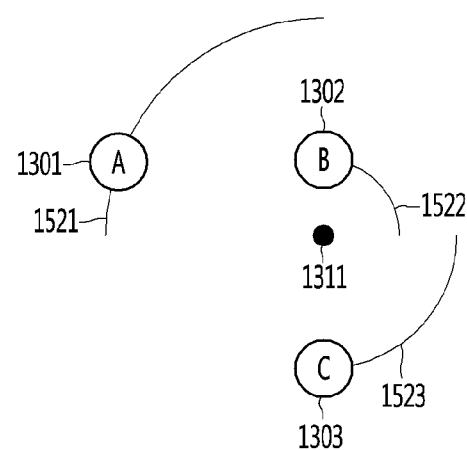

FIGS. 13 to 15 are views illustrating a method for automatically determining a relative location relation between AI apparatuses according to an embodiment of the present invention.

Referring to (a) of FIG. 13, the AI system includes three AI apparatuses 1301, 1302, 1303, and a first AI apparatus 1301 and a third AI apparatus 1303 are arranged perpendicular to a second AI apparatus 1302. In addition, the user 1311 is located between the three AI apparatuses 1301, 1302, 1303.

At least one of the three AI apparatuses 1301, 1302, 1303 illustrated in (a) of FIG. 13 or another AI apparatus included in the AI system may determine a distance to the user 1311 based on the sound signals for the user received from the three AI apparatuses 1301, 1302, 1303.

(b) of FIG. 13 indicates candidate areas 1321, 1322, 1323 in which the AI apparatuses 1301, 1302, 1303 may be located on the basis of the user 1311, based on the distance from each of the AI apparatuses 1301, 1302, 1303 to the user 1311. Herein, a first candidate area 1321 is a candidate area in which the first AI apparatus 1301 may be located, a second candidate area 1322 is a candidate area in which the second AI apparatus 1302 may be located, and a third candidate area 1323 is a candidate area in which the third AI apparatus 1303 may be located.

In (b) of FIG. 13, the user 1311 is only used as a standard point for determining a relative location relation between the AI apparatuses 1301, 1302, 1303, and does not indicate an absolute location of the user 1311.

Referring to (a) of FIG. 14, for example, if the user 1311 moves upward, the user 1311 approaches the first AI apparatus 1301 and the second AI apparatus 1302, and grows away from the third AI apparatus 1301. In addition, each of the AI apparatuses 1301, 1302, 1303 may determine whether they approach or grow away from the user 1311 based on the sound signals of the user.

(b) of FIG. 14 indicates one of the number of cases of candidate areas 1421, 1422, 1423 in which each of the AI apparatuses 1301, 1302, 1303 may be located, when the user 1311 moves, as in (a) of FIG. 14.

Since it may be recognized that the user 1311 draws near on based on the first AI apparatus 1301 and the second AI apparatus 1302, and the user 1311 grows away based on the third AI apparatus 1303, the directions of the first candidate area 1421 and the second candidate 1422 are limited to be opposed to the direction of the third candidate area 1423.

Admittedly, the candidate areas 1421, 1422, 1423 illustrated in (b) of FIG. 14 are only one example. That is, since the AI apparatuses 1301, 1302, 1303 may not recognize the absolute location of the user 1311, since the user 1311 may not be recognized to have moved upward, the candidate areas may be expressed as a large number of cases that the candidate areas 1421, 1422, 1423 illustrated in (b) of FIG. 14 all rotate to a predetermined angle based on a center of a concentric circle. However, the user 1311 may limit candidate areas in which each of the AI apparatuses 1301, 1302, 1303 may be located based on the sound signals continuously received depending on his/her movements, and accordingly, a large number of cases may be narrowed and determined to one case.

Referring to (a) of FIG. 15, for example, if the user 1311 moves to the right, the user 1311 approaches the second AI apparatus 1302 and the third AI apparatus 1303 and grows away from the first AI apparatus 1301. In addition, each of the AI apparatuses 1301, 1302, 1303 may determine whether the user 1311 draws near or grows away based on the sound signals of the user.

(b) of FIG. 15 indicates one of the numbers of cases of the candidate areas 1521, 1522, 1523 in which each of the AI apparatuses 1301, 1302, 1303 may be located, when the user 1311 moved as in (a) of FIG. 15.

Since it may be recognized that the user 1311 draws near based on the second AI apparatus 1302 and the third AI apparatus 1303, and the user 1311 grows away based on the first AI apparatus 1301, the directions of the second candidate area 1522 and the third candidate area 1523 are limited to be opposed to the direction of the first AI candidate area 1521.

Herein, (b) of FIG. 15 indicates one of the numbers of cases of candidate areas in which the candidate areas 1421, 1422, 1423 illustrated in (b) of FIG. 14 are reflected.

As illustrated in FIGS. 14 and 15, by analyzing the sound signals received while the user moves, the candidate areas in which the AI apparatuses may be located, may be narrowed and specified, and accordingly, a relative location relation between each of the AI apparatuses may be determined.

In FIGS. 14 and 15, the candidate areas of each of the AI apparatuses 1301, 1302, 1303 were determined based on whether the user 1311 approaches each of the AI apparatuses 1301, 1302, 1303 depending on his/her movement, and the candidate areas may be narrowed by additionally reflecting information of the distance to the user 1311 thereto.

Herein, although the relative location relation between the AI apparatuses is determined by narrowing the candidate areas depending on the process of FIGS. 13 to 15, all of the determined locations of the AI apparatuses may be rotated or be symmetrical to one another, unlike the relation illustrated in (a) of FIGS. 13 to 15. However, since the relative location relation between each of the AI apparatuses is maintained, it is sufficient enough to determine the path of the user.

In particular, in the process of FIGS. 13 to 15, if one AI apparatus (e.g., the first AI apparatus) is set to be fixed, and the candidate areas of the other AI apparatuses (e.g., the second AI apparatus and the third AI apparatus) gets narrowed, the relative location relation between each of the AI apparatuses may be determined more simply and rapidly.

In particular, if a stereo speaker is included in the external AI apparatus, the direction of the user may be determined based on the sound signals received from the stereo speaker, and if the determined direction of the user is used, the candidate areas for the AI apparatuses may be narrowed more exactly.

In addition, as described above, in the other embodiments of the present invention, the locations of the AI apparatuses 100 and the relative location relation between the AI apparatuses 100 may be determined by the input of the user, and the mutual relative location relation may be determined based on the sound signals or radio signals that the AI apparatuses 100 output and receive among themselves.

Figure 16:
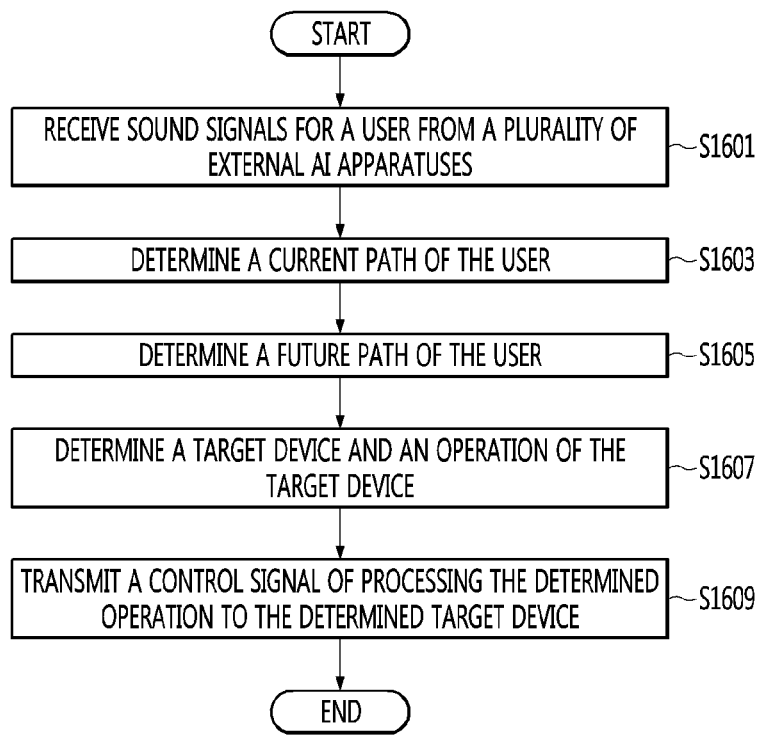
FIG. 16 is a flowchart illustrating a method for providing a service based on a path of a user in an AI apparatus according to an embodiment of the present invention.

FIG. 16 is a flowchart illustrating a method for providing a service based on a path of a user in an AI apparatus 100 according to an embodiment of the present invention.

Referring to FIG. 16, the processor 180 of the AI apparatus 100 receives sound signals for the user from the plurality of external AI apparatuses (S1601).

The AI apparatus 100 may communicate with the plurality of external AI apparatuses through the communication unit 110.

In addition, the AI apparatus 100 may communicate with the controllable devices through the communication unit 110.

Herein, the controllable devices may include an AI device, an Internet of things device and the like, but the present invention is not limited thereto. That is, the controllable devices may include all devices that has a communication function and may control their operations through the communication function.

Then, the processor 180 of the AI apparatus 100 determines the current path of the user based on the sound signals (S1603).

The processor 180 may determine the current path of the user according to the above-described method.

The processor 180 may determine the current path of the user according to the step S609 of determining the current path of the user of FIG. 6.

Then, the processor 180 of the AI apparatus 100 determines the future path of the user based on the sound signals (S1605).

The processor 180 may determine the future path of the user according to the above-described method.

The processor 180 may determine the future path of the user according to the step S611 of determining the future path of the user of FIG. 6.

Then, the processor 180 of the AI apparatus 100 determines a target device and an operation of the target device in consideration of the current path and the future path of the user, and the state information of the controllable devices (S1607).

The processor 180 may determine the target device among the controllable devices corresponding to the current path or the future path of the user, and may determine the operation of the target device.

Herein, the controllable devices may be referred to as candidate devices.

Here, the processor 180 may determine the target device among the controllable devices which are on or adjacent to the current path or the future path.

For example, if the current path of the user is a path which approaches the refrigerator by passing the TV, and the future path of the user is path which approaches the washing machine by passing the refrigerator, the processor 180 may determine the target device among the TV, the refrigerator and the washing machine, and may determine another AI apparatus or Internet of things device included in a space provided with the TV, the refrigerator and the washing machine, to be the target device.

Here, the operation of the target device may include an operation to output state information of the target device or an operation to output state information of other devices, as well as an operation to control the target device. The other devices being targets of the state information may be referred to as information providing devices. That is, the information providing device is a device different from the target device, and is a device being the target of the state information which the target device provides.

The processor 180 may determine the target device first and then determine the operation of the target device, but the present invention is not limited thereto. That is, either of the determinations of the target device and the operation of the target device may be first performed without any predetermined order, and both of the determinations may be simultaneously considered and performed.

The processor 180 may be considered to determine a pair (of the target device and the operation of the target device), and in particular, the processor 180 may determine at least one pair (of the target device and the operation of the target device).

Here, the processor 180 may determine whether a specific operation needs to be performed among the controllable devices or the candidate devices, based on the current path and the future path of the user, and the state information of the controllable devices, and may determine a device to perform the corresponding specific operation to be the target device.

For example, if the user moved from a front door to a living room currently, and he/she is expect to move from the living room to a bedroom, the processor 180 may recognize states of a lamp installed in the front door, a lamp installed in the living room, and a lamp installed in the bedroom. If the lamp installed in the front door is turned on, the processor 180 may determine an operation to turn it off, if the lamp installed in the living room is turned off, the processor 180 may determine an operation to turn it on, and if the lamp installed in the bedroom is turned off, the processor 180 may determine an operation to turn it on.

Here, the processor 180 may determine whether there are other device (e.g., the information providing devices) to provide the user with state information among the controllable devices or the candidate devices, may determine a device currently closest to the location of the user or closest to a final location of the future path of the user to be the target device, and may determine the operation of the target device to be providing the state information of the information providing devices.

Here, the processor 180 may determine the target device and the operation of the target device by additionally considering at least one of the current time information, the weather information, the record of the interaction with the user or the content of the utterance voice of the user.

For example, it is assumed that the user goes out every morning and comes home early in the evening on weekdays, and if the user gets home, he/she goes to a bedroom first and then goes out to a living room to turn on the TV. If it was a weekday, and the user went out in the morning and came home early in the evening, the processor 180 may expect the user to move in order of the bedroom and the living room with a high possibility. Further, based on this, the processor 180 may determine the future path of the user to be moving in order of the bedroom and the living room. Furthermore, the processor 180 may determine the pair (of the target device and the operation of the target device) to be (the lamp of the living room, turning-on), (the lamp of the bedroom, temporary turning-on), and (the TV, turning on the power).

Herein, the operation of the target device may include the contents for not only what operation the user will perform, but also when the corresponding operation will be performed. That is, the processor 180 may determine the operation, i.e., when to perform the target device and what will be performed. Thus, the operation of the target device may include behavior information which indicates the content of the operation and time information which indicates a time of the operation.

Here, the processor 180 may predict a time when the user approaches the target device within a predetermined distance based on the future path of the user, and may determine time information of the operation of the target device based on the corresponding time. For example, if the user is expected to arrive at the bedroom after 5 seconds, the processor 180 may determine the target device to be "the lamp of the living room" and determine the operation of the lamp of the living room to be "turning-on", and may set time information of the lamp of the bedroom lamp to "after 5 seconds" such that the lamp of the living room is turned on after 5 seconds.

Then, the processor 180 of the AI apparatus 100 transmits a control signal of processing the determined operation corresponding to the determined target device (S1609).

The processor 180 may allow the target device to perform an operation corresponding to the path of the user, by transmitting a control signal so as to process the determined operation in the determined target device.

Here, the processor 180 may transmit an output signal so as to output a notification to inform the determined target device of the determined operation performance.

Further, as described above, since the processor 180 may identify each of the users for the sound signals, it may determine the target device appropriate per each user and the operation of the target device.

That is, the processor 180 may provide a personalized service by specifying the user for the sound signals, determining a current path of the specified user, determining a path of the specified user based on at least one of the current path of the specified user, current time information or a record of a path, and determining the target device appropriate for the corresponding user and the operation of the target device.

Figure 17:
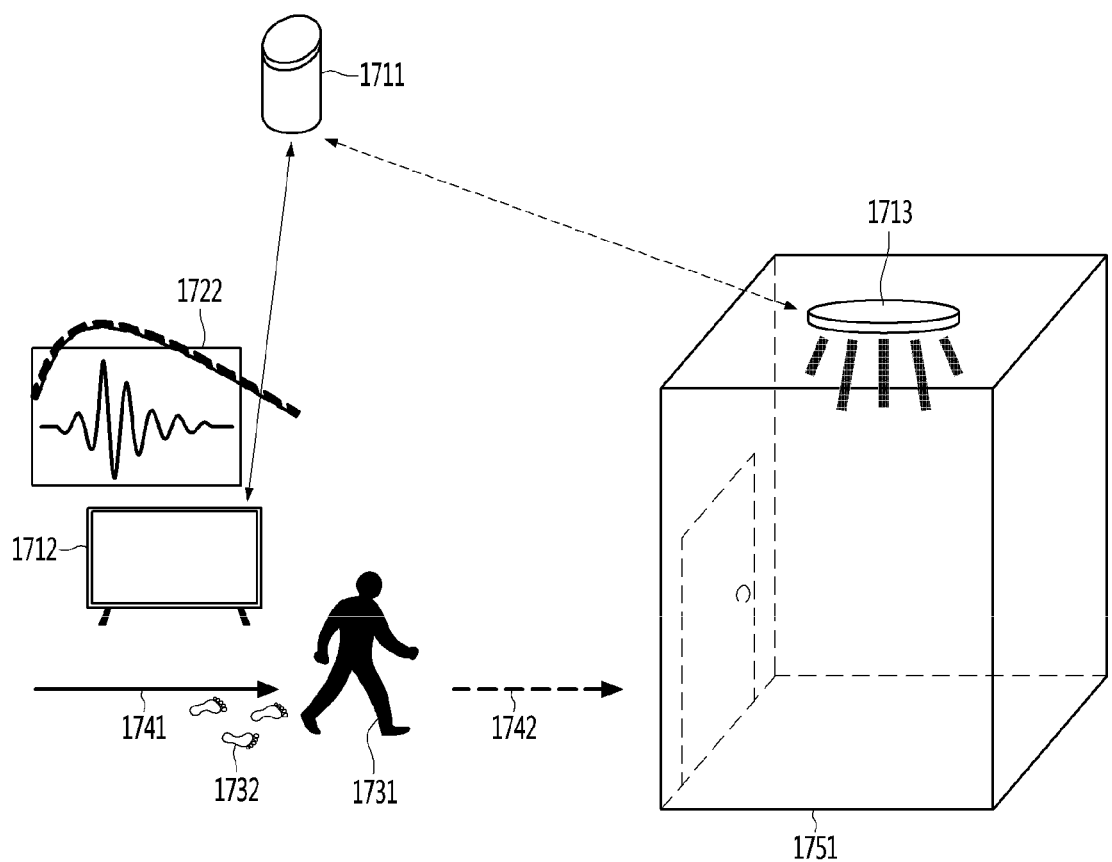
FIGS. 17 and 18 are views illustrating a method for providing a service based on a path of a user according to an embodiment of the present invention.
Figure 18:
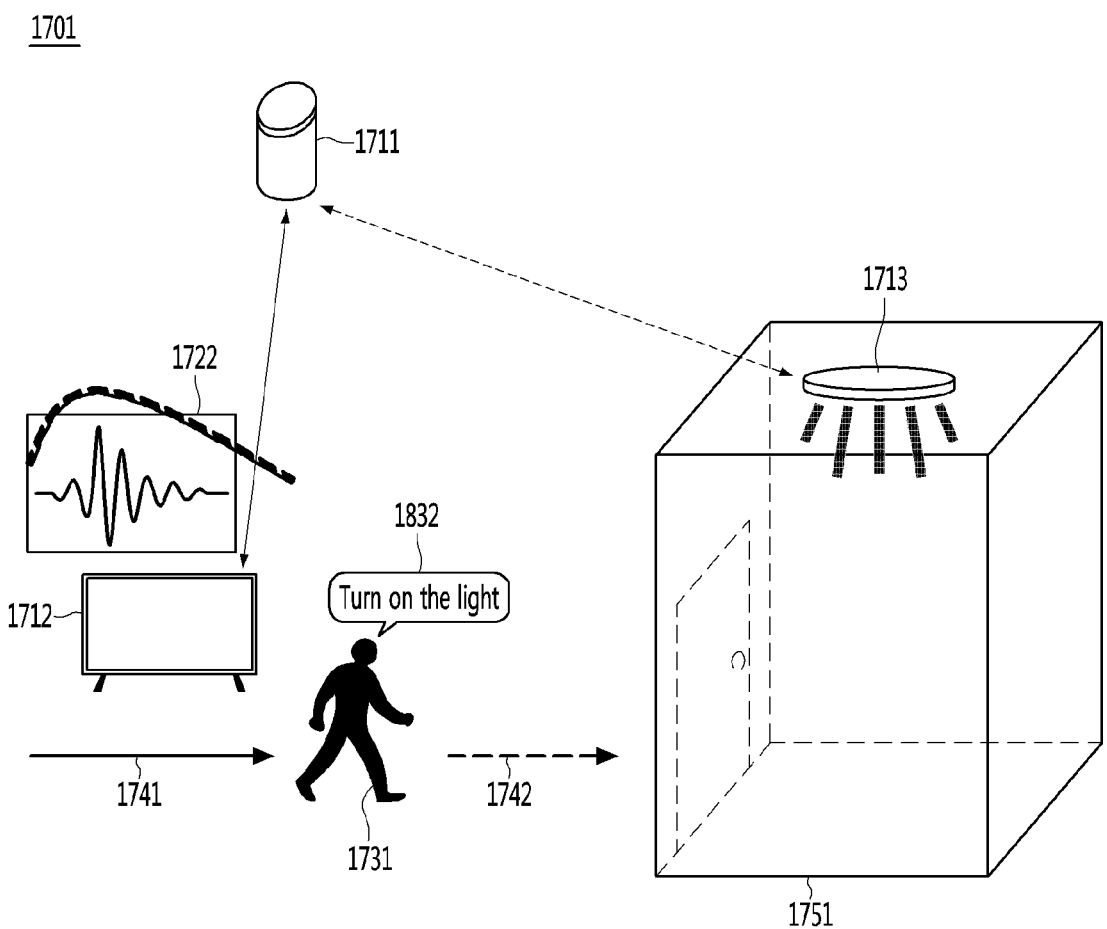

FIGS. 17 and 18 are views illustrating a method for providing a service based on a path of a user according to an embodiment of the present invention.

Referring to FIGS. 17 and 18, according to an embodiment of the present invention, an AI system 1701 includes an AI speaker 1711 functioning as a main agent or a hub, a TV 1712 as an external AI apparatus, and so forth, and includes a lamp 1713 of a bedroom 1751 as an Internet of things device.

The user 1731 is moving toward the bedroom 1751 by passing the TV 1712. As the user 1731 moves along a path 1741, a volume of a sound signal 1722 received from the TV 1712 is increased and back decreased. Herein, the sound signal may include an utterance voice 1832 of the user, and may include a footstep sound 1732 of the user.

The AI speaker 1712 may receive the sound signals (1722 and the like) received from the AI apparatuses such as the TV 1712 and so forth, and may determine the current path of the user 1731 to be the first path 1741 based on sound volumes of the received sound signals (1722 and the like) and changes of the sound volumes.

In addition, the AI speaker 1711 may determine the future path to be a second path 1742 moving to the bedroom 1751 based on the current path 1741, a record of a path of the user 1731 and the like.

FIGS. 17 and 18 do not illustrate the AI apparatus around the bedroom 1751, but in spite of this case, if there is a pattern that the user 1731 usually moves to the bedroom while watching the TV 1712, the AI speaker 1711 may determine the future path of the user 1731 to be the second path 1742.

In addition, since the AI speaker 1711 determined that the user 1731 moves to the bedroom 1751, it determines a turning-on state of the lamp 1713 of the bedroom 1751, and if the lamp 1713 is turned off, the target device is determined to be the lamp 1713, and the operation of the lamp 1713 as the target device may be determined to be turning-on.

As illustrated in FIG. 18, although the user 1731 utters without clarifying a target like "turn on the light" (1832), the AI speaker 1711 may determine that an utterance intension is to turn on the lamp 1713 of the bedroom 1751, based on the current path 1741 and the future path 1742 of the user. In addition, the AI speaker 1711 may determine the target device to be the lamp 1713 of the bedroom 1751, and may determine the operation of the lamp 1713 as the target device to be turning-on.

Accordingly, if the user 1731 moves the bedroom 1751, the AI speaker 1711 may automatically turn on the lamp 1713 of the bedroom 1751.

According to the present invention, although there is no utterance voice of the user as in FIG. 17, a service appropriate for a path may be provided by predicting the path of the user, and although the user utters without clearly indicating the target as in FIG. 18, an appropriate service may be provided by more exactly determining the intension of the user.

Figure 19:
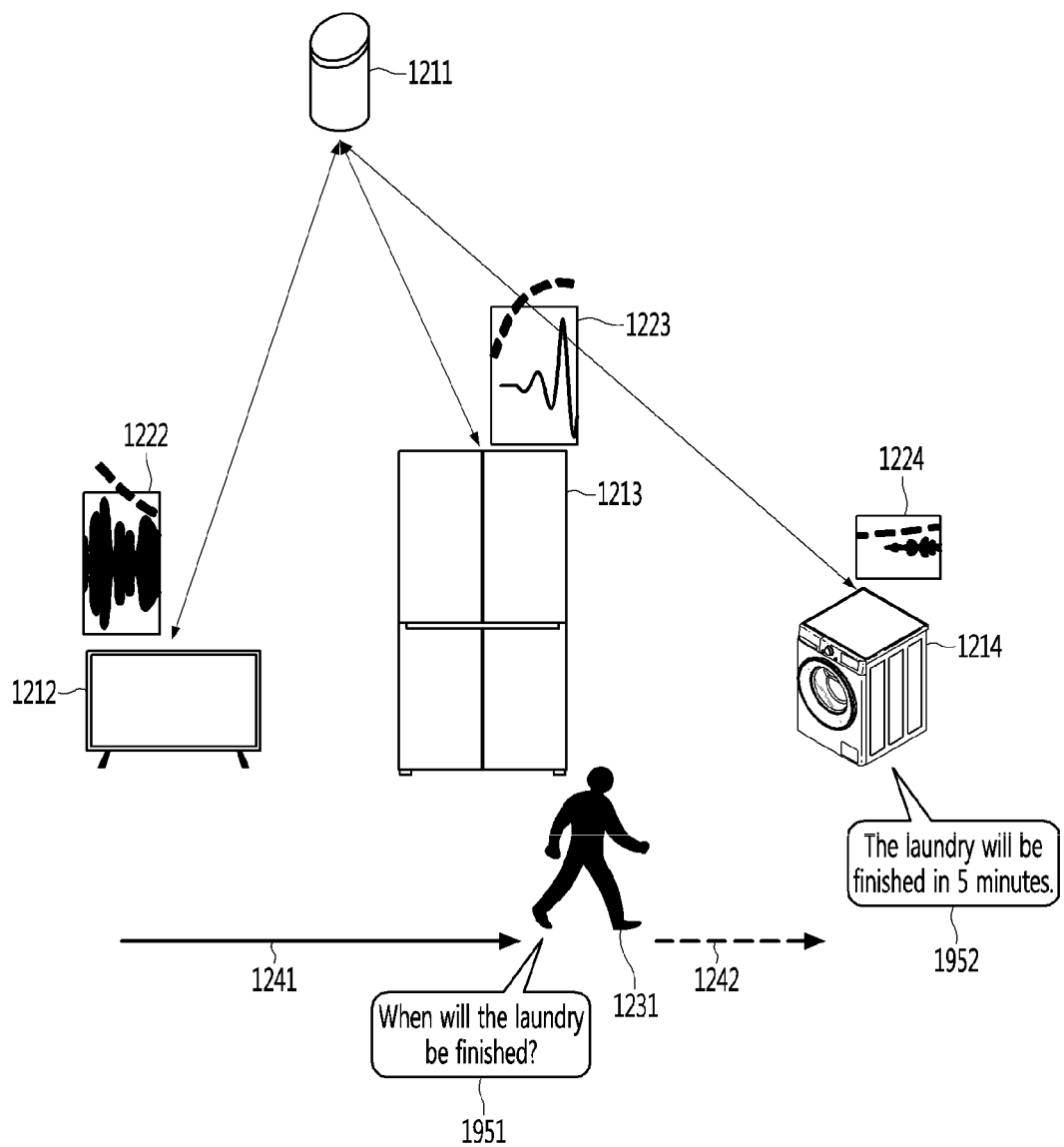
FIG. 19 is a view illustrating a method for providing a service based on a path of a user according to an embodiment of the present invention.

FIG. 19 is a view illustrating a method for providing a service based on a path of a user according to an embodiment of the present invention.

In particular, FIG. 19 illustrates a situation that the user 1231 moves toward the washing machine 1214 by passing from the TV 1212 to the refrigerator 1213, and says "When will the laundry be finished?" (1951), in the AI system 1201 illustrated in FIG. 12. The redundant repeat of FIG. 12 will be omitted below.

The AI speaker 1211 may determine the current path of the user to be the first path 1241 which moves by passing from the TV 1212 to the refrigerator 1213, based on the sound signals 1222, 1223, 1224 received from the TV 1212, the refrigerator 1213 and the washing machine 1214.

In addition, the AI speaker 1211 may determine the future path of the user to be the second path 1242 which faces from the refrigerator 1213 to the washing machine 1214, based on the current path 1241 and the content of the utterance voice of the user 1231 like "When will the laundry be finished?" (1951).

Here, as described above, when the AI speaker 1211 determines the future path to be the second path 1242, it may additionally consider the record of the path of the user, and the state information of each of the AI apparatuses, the current time information, the weather information and the like.

In addition, the AI speaker 1211 may receive intension information of the utterance voice 1951 of the user using the NLP engine, and determine the operation of the target device to be providing, as a response, situation information for a washing operation of the washing machine 1214 based on this.

In addition, the AI speaker 1211 may recognize that the user 1231 is approaching the washing machine 1214 from the future path 1242 of the user, and may determine the washing machine 1214 to be the target device.

In addition, the AI speaker 1211 may transmit an output signal to the washing machine 1214, the output signal outputting a response like "The laundry will be finished in 5 minutes." (1952) as situation information for the washing operation of the washing machine 1214.

Figure 20:
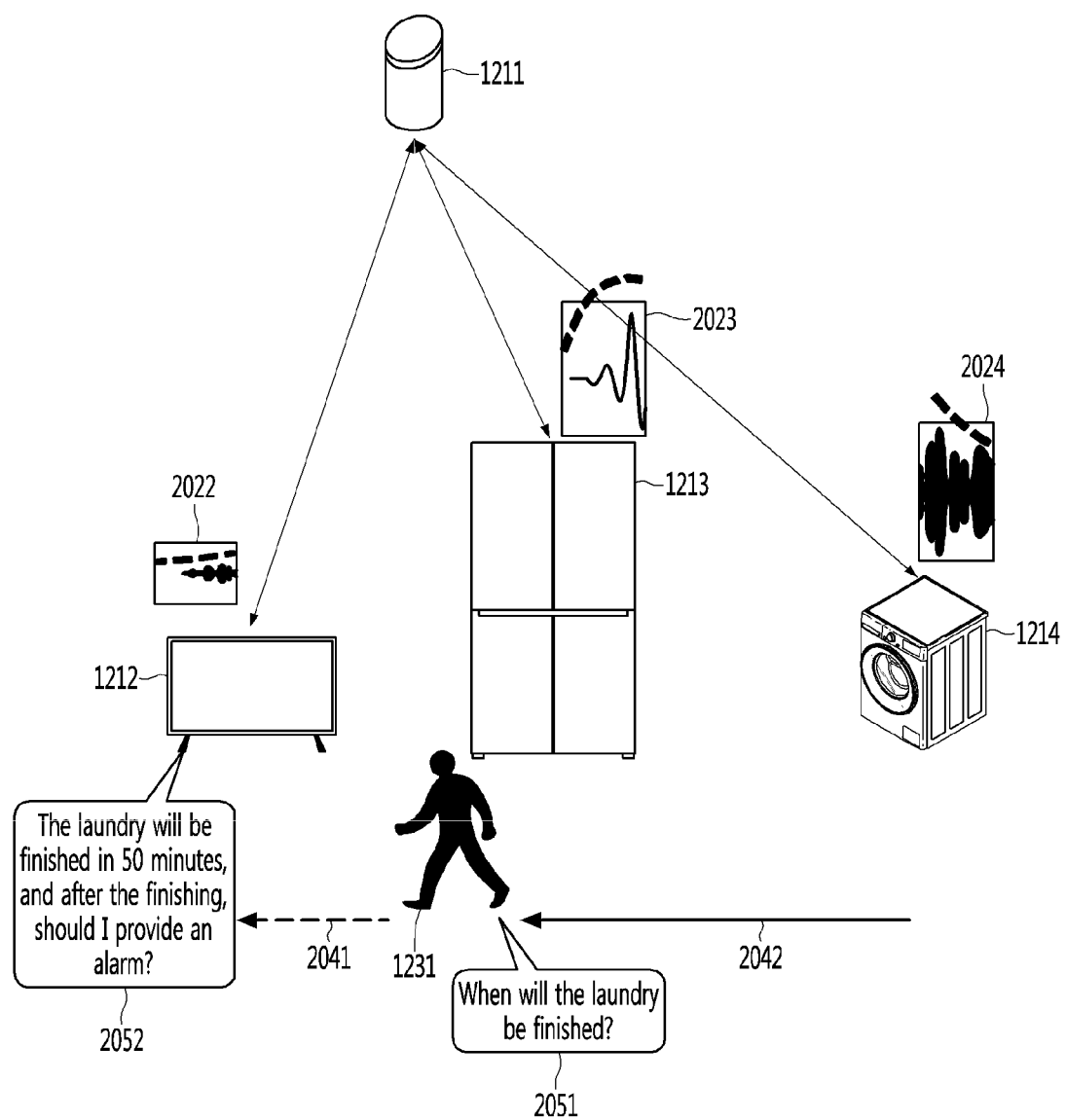
FIG. 20 is a view illustrating a method for providing a service based on a path of a user according to an embodiment of the present invention.

FIG. 20 is a view illustrating a method for providing a service based on a path of a user according to an embodiment of the present invention.

In particular, FIG. 20 illustrates a situation that the user 1231 moves toward the TV 1212 by passing from the washing machine 1214 to the refrigerator 1213, and says "When will the laundry be finished?" (2051), in the AI system 1201 illustrated in FIG. 12. The redundant repeat of FIG. 12 will be omitted below.

The AI speaker 1211 may determine the current path of the user to be a third path 2041 which moves bypassing from the washing machine 1214 to the refrigerator 1213, based on sound signals 2022, 2023, 2024 received from the TV 1212, the refrigerator 1213 and the washing machine 1214.

In addition, the AI speaker 1211 may determine the future path of the user to be a fourth path 2042 which faces from the refrigerator 1213 to the TV 1212, based on the current path 2041.

Here, as described above, when the AI speaker 1211 determines the future path to be the fourth path 2042, it may additionally consider the record of the path of the user, and the state information of each of the AI apparatuses, the current time information, the weather information and the like.

In addition, the AI speaker 1211 may receive intension information of the utterance voice 2051 of the user using the NLP engine, and determine the operation of the target device to be providing, as the response, the situation information for the washing operation of the washing machine 1214 based on this.

In addition, the AI speaker 1211 may recognize that the user 1231 is approaching the TV 1212 from the future path 2042 of the user, and may determine the TV 1212 to be the target device.

In addition, the AI speaker 1211 may transmit the output signal to the TV 1212, the output signal outputting the response like "The laundry will be finished in 50 minutes, and after the finishing, should I provide an alarm?" (2052), as the situation information for the washing operation of the washing machine 1214.

Figure 21:
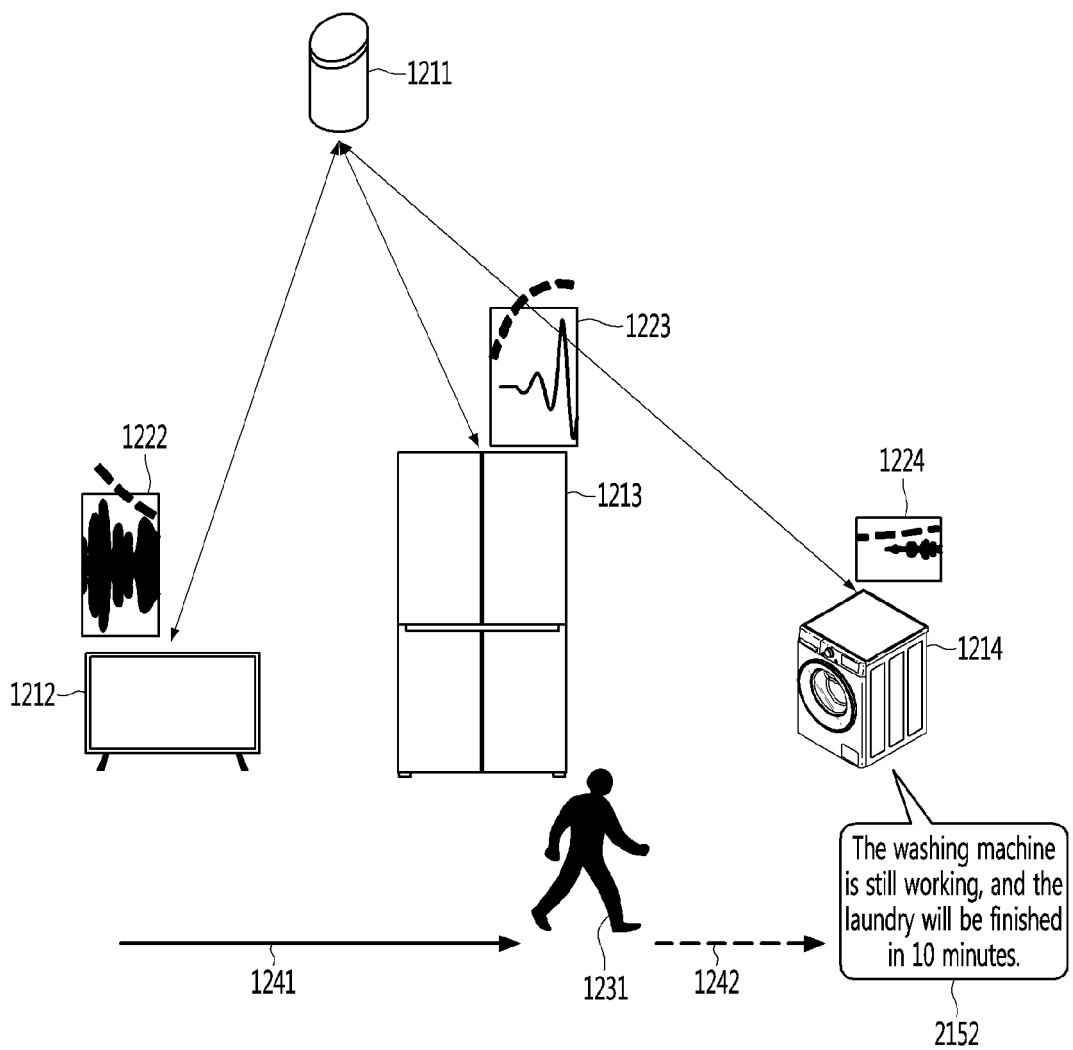
FIG. 21 is a view illustrating a method for providing a service based on a path of a user according to an embodiment of the present invention.

FIG. 21 is a view illustrating a method for providing a service based on a path of a user according to an embodiment of the present invention.

In particular, FIG. 21 illustrates a situation that the user 1231 moves toward the washing machine 1214 by passing from the TV 1212 to the refrigerator 1213, and has no utterance, in the AI system 1201 illustrated in FIG. 12. The redundant repeat of FIG. 12 will be omitted below.

The AI speaker 1211 may determine the current path of the user to be the first path 1241 which moves by passing from the TV 1212 to the refrigerator 1213, based on the sound signals 1222, 1223, 1224 received from the TV 1212, the refrigerator 1213 and the washing machine 1214.

In addition, the AI speaker 1211 may determine the future path of the user to be the second path 1242 which faces from the refrigerator 1213 to the washing machine 1214, based on the current path 1241.

Here, as described above, when the AI speaker 1211 determines the future path to be the second path 1242, it may additionally consider the record of the path of the user, and the state information of each of the AI apparatuses, the current time information, the weather information and the like.

In addition, the AI speaker 1211 may determine the operation of the target device to be providing information for the controllable devices located in the future path 1242 of the user or adjacent to the future path 1242.

For example, the AI speaker 1211 may determine the operation of the target device to be providing information of the washing machine 1214 adjacent to a final location of the future path 1242.

In addition, the AI speaker 1211 may recognize that the user 1231 is approaching the washing machine 1214 from the future path 1242 of the user, and may determine the washing machine 1214 to be the target device.

In addition, the AI speaker 1211 may transmit an output signal to the washing machine 1214 without any separate request or utterance of the user, the output signal outputting a response like "The washing machine is still working, and the laundry will be finished in 10 minutes." (2152) as the situation information for the washing operation of the washing machine 1214.

Here, the target device or a device to which information is provided may be selected from the controllable devices located on the future path 1242 or adjacent to the future 1242.

Here, the target device or the device to which information is provided may be selected as the controllable device closest to the current user, and may be selected as the controllable device closest to the final location of the future path 1242.

Figure 22:
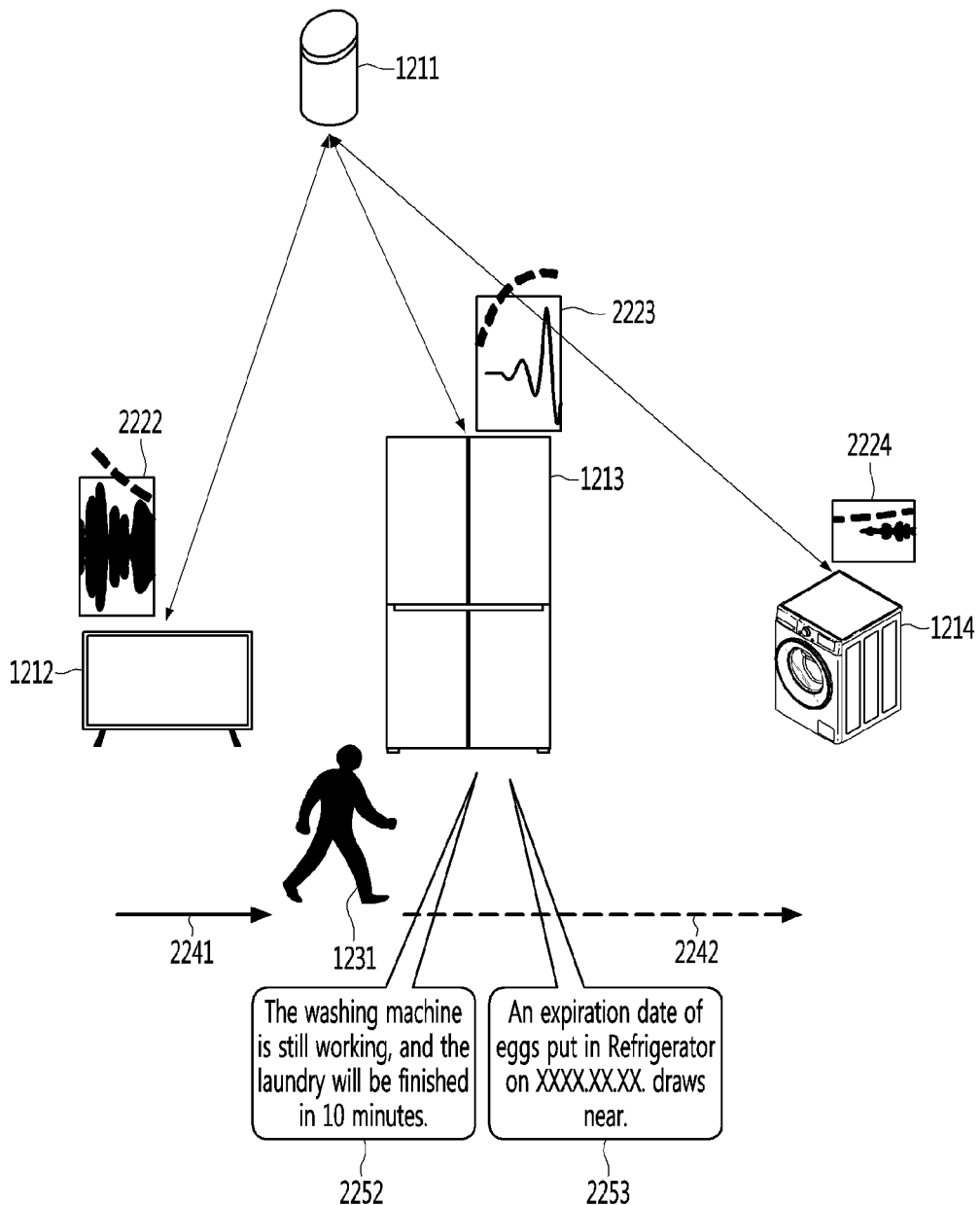
FIG. 22 is a view illustrating a method for providing a service based on a path of a user according to an embodiment of the present invention.

FIG. 22 is a view illustrating a method for providing a service based on a path of a user according to an embodiment of the present invention.

In particular, FIG. 22 illustrates a situation that the user 1231 moves from the TV 1212 to the refrigerator 1213 and has no utterance, in the AI system 1201 illustrated in FIG. 12. The redundant repeat of FIG. 12 will be omitted below.

The AI speaker 1211 may determine the current path of the user to be a fifth path 2241 which moves from the TV 1212 to the refrigerator 1213, based the sound signals 2222, 2223, 2224 received from the TV 1212, the refrigerator 1213 and the washing machine 1214.

In addition, the AI speaker 1211 may determine the future path of the user to be a sixth path 2242 which moves to the washing machine 1214 by passing the refrigerator 1213, based on the current path 2241.

Here, as described above, when the AI speaker 1211 determines the future path to be the sixth path 2242, it may additionally consider the record of the path of the user, and the state information of each of the AI apparatuses, the current time information, the weather information and the like.

Herein, the AI speaker 1211 may determine the operation of the target device to be providing information for the controllable device located in the future path 2242 of the user or adjacent to the future path 2242.

Herein, the information for the controllable device may include operation information of a device, state information of the device, and information for contents of the device.

The information for the contents of the device may include the laundry of the washing machine, food and drink of the refrigerator, a broadcast program of the TV, and so forth.

For example, the AI speaker 1211 may determine the operation of the target device to be providing information of the washing machine 1214 adjacent to the final location of the future path 2242, or providing information of the refrigerator 1213 located on the future path 2242.

In addition, the AI speaker 1211 may recognize that the user 1231 is approaching the refrigerator 1213 from the future path 2242 of the user, and may determine the refrigerator 1213 to be the target device.

In addition, without any separate request or utterance of the user, the AI speaker 1211 may transmit an output signal to the washing machine 1214, the output signal outputting a response like "The washing machine is still working, and the laundry will be finished in 10 minutes." (2252) as the situation information for the washing operation of the washing machine 1214, or may transmit an output signal to the refrigerator 1213, the output signal outputting a response like "An expiration date of eggs put in Refrigerator on XXXX.XX.XX. draws near." (2253), or "The right refrigerated container is highly contaminated. Please clean it up." as state information of the refrigerator 1213.

According to an embodiment of the present invention, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence (AI) apparatus for determining a path of a user, the AI apparatus comprising:
   a communication unit configured to communicate with a plurality of external AI apparatuses; and
   a processor configured to:
   determine a maximum value of an utterance volume of the user for each of the plurality of external AI apparatuses using sound signals,
   set an utterance volume in a distance closest from the external AI apparatus to the maximum value of the utterance volume of the corresponding external AI apparatus,
   receive the sound signals of the user from the plurality of external AI apparatuses while the user passes from a first AI apparatus to a second AI apparatus,
   calculate a distance and a variation of the distance from each of the plurality of external AI apparatuses to the user based on a volume of the received sound signals and the set utterance volume in a distance closest of the plurality of external apparatuses including the first AI apparatus and the second AI apparatus,
   determine candidate areas in which each of the plurality of external AI apparatuses can be disposed based on the distance and the variation of the distance calculated at different times,
   determine at least one of locations or relative location relations of the plurality of external AI apparatuses based on the determined candidate areas,
   determine a current path of the user using at least one of the locations or the relative location relations based on the calculated distance and the calculated variation of the distance, and
   determine a future path of the user based on the current path.

2. The AI apparatus of claim 1, wherein the processor is configured to determine the future path of the user to be expected to move from the current path based on the current path and record of the path of the user.

3. The AI apparatus of claim 2, wherein the processor is configured to determine the future path by additionally considering at least one of current time information, weather information, a record of interaction with the user, state information of the plurality of external AI apparatuses or a content of an utterance voice of the user.

4. The AI apparatus of claim 1, wherein the sound signals include at least one of an utterance voice of the user or a footstep sound of the user.

5. The AI apparatus of claim 4, wherein the processor is configured to identify a plurality of users through a voice-print analysis for the utterance voice or a pattern analysis for the footstep sound.

6. The AI apparatus of claim 1, wherein the processor is further configured to:
request the user to utter in the distance closest to each of the external AI apparatuses, and
set an utterance volume in the closest distance based on a received utterance voice of the user, for each of the plurality of external AI apparatuses.

7. The AI apparatus of claim 6, wherein the processor is configured to:
set the utterance volume in the distance closest to each of the external AI apparatuses per each user, by distinguishing utterance voices for a plurality of users from each other.

8. The AI apparatus of claim 1, wherein the processor is configured to determine the location of at least one external AI apparatus based on a user input.

9. A method for determining a path of a user, comprising:
requesting the user to utter in the distance closest to each of the external AI apparatuses,
setting an utterance volume in the closest distance based on a received utterance voice of the user, for each of the plurality of external AI apparatuses,
receiving sound signals of the user from a plurality of external AI apparatuses while the user passes from the first AI apparatus to the second AI apparatus,
calculating a distance and a variation of the distance from each of the plurality of external AI apparatuses to the user based on a volume of the received sound signals and the set utterance volume in a distance closest of the plurality of external apparatuses including the first AI apparatus and the second AI apparatus,
determining candidate areas in which each of the plurality of external AI apparatuses can be disposed based on the distance and the variation of the distance calculated at different times,
determining at least one of locations or relative location relations of the plurality of external AI apparatuses based on the determined candidate areas,
determining a current path of the user using at least one of the locations or the relative location relations based on the calculated distance and the calculated variation of the distance, and
determining a future path of the user to be expected to move from the current path based on the current path and at least one of a record of the path of the user, current time information, weather information, a record of interaction with the user, state information of the plurality of external AI apparatuses, or a content of an utterance voice of the user.

10. A non-transitory computer-readable recording medium recording thereon a program for performing operations for determining a path of a user, wherein the operations comprise:
requesting the user to utter in the distance closest to each of the external AI apparatuses,
setting an utterance volume in the closest distance based on a received utterance voice of the user, for each of the plurality of external AI apparatuses,
receiving sound signals of the user from a plurality of external AI apparatuses while the user passes from the first AI apparatus to the second AI apparatus,
calculating a distance and a variation of the distance from each of the plurality of external AI apparatuses to the user based on a volume of the received sound signals and the set utterance volume in a distance closest of the plurality of external apparatuses including the first AI apparatus and the second AI apparatus,
determining candidate areas in which each of the plurality of external AI apparatuses can be disposed based on the distance and the variation of the distance calculated at different times,
determining at least one of locations or relative location relations of the plurality of external AI apparatuses based on the determined candidate areas,
determining a current path of the user using at least one of the locations or the relative location relations based on the calculated distance and the calculated variation of the distance, and
determining a future path of the user to be expected to move from the current path based on the current path and at least one of a record of the path of the user, current time information, weather information, a record of interaction with the user, state information of the plurality of external AI apparatuses, or a content of an utterance voice of the user.

11. The AI apparatus of claim 1, wherein the processor is configured to:
receive the sound signals through a stereo microphone of the external AI apparatus,
determine a direction of the user based on an input time difference of the sound signals caused by a location difference of each microphone of the stereo microphone, and
determine the candidate areas of the external AI apparatus based on the distance, the variation of the distance calculated at different times, and the direction of the user.

12. The AI apparatus of claim 1, wherein the external AI apparatuses includes a robot cleaner to recognize its own location and the other external AI apparatuses in a space by using image data acquired through a loaded camera while moving, the processor is configured to determine at least one of locations of the plurality of external AI apparatuses or location relations between the external AI apparatuses, based on data received from the robot cleaner.

13. The AI apparatus of claim 5, wherein the processor is configured to:
specify the user for the sound signals when the sound signals are received,
determine the current path of the specified user, and
determine the future path of the specified user based on at least one of the current path of the specific user, current time information or record of the path of the specific user.

14. The AI apparatus of claim 1, wherein the current path and the future path is expressed with at least one of expression based on the external AI apparatus, a keyword which indicates a specific space, a location or coordinates information on a map data.

15. The method of claim 9, wherein determining the candidate areas comprises:
   receiving the sound signals through a stereo microphone of the external AI apparatus,
   determining a direction of the user based on an input time difference of the sound signals caused by a location difference of each microphone of the stereo microphone, and
   determining the candidate areas of the external AI apparatus based on the distance, the variation of the distance calculated at different times, and the direction of the user.

16. The non-transitory computer-readable recording medium of claim 10, wherein determining the candidate areas comprises:
   determining a direction of the user using an input time difference of the sound signals received through a stereo microphone of the external AI apparatus, and
   determining the candidate areas based on the direction of the user, the distance and the variation of the distance calculated at different times.

* * * * *